(12) United States Patent
Ohmuro et al.

(10) Patent No.: US 8,040,468 B2
(45) Date of Patent: Oct. 18, 2011

(54) LIQUID CRYSTAL DISPLAY DEVICE

(75) Inventors: Katsufumi Ohmuro, Minami-ashigara (JP); Ryuta Takegami, Minami-ashigara (JP); Zemin Shi, Minami-ashigara (JP); Kiyokazu Hashimoto, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 278 days.

(21) Appl. No.: 12/549,735

(22) Filed: Aug. 28, 2009

(65) Prior Publication Data

US 2010/0053511 A1 Mar. 4, 2010

(30) Foreign Application Priority Data

Aug. 28, 2008 (JP) ................................. 2008-219309

(51) Int. Cl.
G02F 1/1335 (2006.01)
(52) U.S. Cl. ............................ 349/102; 349/96; 349/117
(58) Field of Classification Search .................. 349/117, 349/118, 119, 96, 97, 98, 102
See application file for complete search history.

(56) References Cited

U.S. PATENT DOCUMENTS

| | | | |
|---|---|---|---|
| 5,583,679 A | 12/1996 | Ito et al. | |
| 7,532,286 B2 * | 5/2009 | Maruyama et al. | 349/117 |
| 7,777,845 B2 * | 8/2010 | Aminaka et al. | 349/118 |
| 7,929,089 B2 * | 4/2011 | Sato et al. | 349/119 |
| 2007/0040963 A1 * | 2/2007 | Maruyama et al. | 349/96 |
| 2009/0091691 A1 * | 4/2009 | Sato et al. | 349/96 |
| 2010/0053511 A1 * | 3/2010 | Ohmuro et al. | 349/102 |
| 2011/0052837 A1 * | 3/2011 | Hashimoto et al. | 428/1.3 |

FOREIGN PATENT DOCUMENTS

| | | |
|---|---|---|
| JP | 6-222213 A | 8/1994 |
| JP | 7-333437 A | 12/1995 |
| JP | 2587398 B2 | 12/1996 |
| JP | 2003-25414 A | 1/2003 |
| JP | 2007-38646 A | 2/2007 |

\* cited by examiner

*Primary Examiner* — Brian Healy

(74) *Attorney, Agent, or Firm* — Buchanan Ingersoll & Rooney PC

(57) ABSTRACT

The invention relates to a liquid crystal display device comprising a retardation layer wherein an in-plane slow axis of the retardation layer is within the direction of 90±40 degrees relative to an absorption axis of the polarizing layer disposed at a closer position to the retardation layer; Re(550) meets following relation, 25 nm≦Re(550)≦230 nm; R[40°] of the retardation layer which is measured for incident light in a direction tilted by 40 degrees toward the tilt direction of the retardation layer relative to the normal line of the retardation layer meets following relation, 0 nm≦R[40°]≦300 nm; and R[+40°] of the retardation layer and retardation R[−40°] of the retardation layer meet following relation, 1<R[+40°]/R[−40°].

12 Claims, 5 Drawing Sheets

LIQUID CRYSTAL DISPLAY DEVICE

CROSS-REFERENCE TO RELATED APPLICATIONS

This application claims benefit of priority under 35 U.S.C. 119 to Japanese Patent Application No. 2008-219309 filed on Aug. 28, 2008, which is expressly incorporated herein by reference in its entirety.

BACKGROUND OF THE INVENTION

1. Technical Field

The present invention relates to an improvement of a viewing angle characteristic of a liquid crystal display device.

2. Background Art

In liquid crystal display devices, optical films displaying various optical characteristics have hitherto been used for optical compensation corresponding to a mode thereof. For example, an optically compensatory film having an optically anisotropic layer composed of a liquid crystal composition on a transparent support composed of a polymer film is proposed as an optically compensatory film of a TN mode liquid crystal display device (see, for example, Japanese Patent No. 2587398).

Also, it is proposed to use a polymer film whose optical axis is inclined in the thickness direction for the optical compensation of a TN mode liquid crystal display device in place of the optically compensatory film having an optically anisotropic layer composed of a liquid crystal composition.

For example, JP-A-7-333437 and JP-A-6-222213 each describe a method of leading a film to pass through two rolls running at a different peripheral speed whereby a shearing stress is applied to the film to produce a film having a tilted optical axis, indicating the application of the film to TN-mode liquid crystal displays. However, the methods described in the documents have some problems in that the optical properties of the films produced greatly fluctuate and that the surfaces of the films are readily scratched.

JP-A2003-25414 and JP-A2007-38646 each propose a method of producing an optical film whose optical axis is inclined in the thickness direction by having a melt of thermoplastic polymer composition through the nip between two rolls running at a certain condition. According to the methods described in the documents, the above mentioned problem may be solved.

On the other hand, a liquid crystal display device is used as not only a display for personal computer, which is basically used by a single person but a display for television, which is observed by a plurality of persons from various directions.

SUMMARY OF THE INVENTION

The present inventors conducted various studies, and as a result, they found that, regarding a liquid crystal display device to be observed by a plurality of persons from various directions, improvement in viewing-angle characteristics cannot be achieved by just using any film whose optical axis is tilted in the thickness direction.

An object of the invention is to provide a liquid crystal display device with an improved viewing angle characteristic.

The means for achieving the above mentioned object are as follows.

[1] A liquid crystal display device comprising:
 a pair of polarizing layers disposed so that respective absorption axes thereof are orthogonal to each other;
 a liquid crystal cell comprising:
  a first substrate and a second substrate being disposed so that they face each other between the pair of the polarizing layers, at least one of which has a transparent electrode, and
  a liquid crystal layer disposed between the first substrate and the second substrate; and
 a retardation layer disposed between at least one of the pair of the polarizing layers and the liquid crystal cell, wherein
 an in-plane slow axis of the retardation layer is within the direction of 90±40 degrees relative to an absorption axis of the polarizing layer disposed at a closer position to the retardation layer;
 retardation in plane at a wavelength of 550 nm, Re(550), of the retardation layer meets following relation (I):

$$25\ nm \leq Re(550) \leq 230\ nm \tag{1}$$

R[40°] of the retardation layer, which is retardation measured for incident light having a wavelength of 550 nm coming in a direction tilted by 40 degrees toward the tilt direction of the retardation layer relative to the normal line of the retardation layer, the direction being in a plane (incident plane) which includes the normal line and the tilt direction of the retardation layer, meets following relation (II):

$$0\ nm \leq R[40°] \leq 300\ nm \tag{II}$$

and

R[+40°] of the retardation layer, which is retardation measured for incident light having a wavelength of 550 nm coming in a first direction tilted by 40 degrees toward the tilt direction of the retardation layer relative to the normal line of the retardation layer, and R[−40°] of the retardation layer, which is retardation measured for incident light having a wavelength of 550 nm coming in a second direction tilted by 40 degrees oppositely toward the tilt direction of the retardation layer relative to the normal line of the layer, meet following relation (III):

$$1 < R[+40°]/R[-40°] \tag{III}$$

provided that the first and second directions are directions in a same plane (incident plane) that includes the normal line and the tilt direction of the retardation layer, and R[+40°]>R[−40°].

[2] The liquid crystal display device according to [1], wherein the in-plane slow axis of the retardation layer is orthogonal to the absorption axis of the polarizing layer disposed at a closer position to the retardation layer.

[3] The liquid crystal display device according to [1] or [2], wherein the retardation layer is disposed between one of the pair of the polarizing layers and the liquid crystal cell, and the Re(550) of the retardation layer is from 25 to 230 nm.

[4] The liquid crystal display device according to [1] or [2], wherein the retardation layer is disposed between the both of the pair of the polarizing layers and the liquid crystal cell, and the Re(550) of the retardation layer is from 25 to 230 nm.

[5] The liquid crystal display device according to any one of [1] to [4], wherein the retardation layer has a principal axis tilted by from 9 to 47 degrees in the thickness direction.

[6] The liquid crystal display device according to any one of [1] to [5], wherein the retardation layer is a film comprising at least one selected from the group consisting of cyclic olefin copolymers, cellulose acylates, polyesters and polycarbonates.

[7] The liquid crystal display device according to [6], wherein the retardation layer is a film formed of a composition comprising less than two materials selected from the group consisting of cyclic olefin copolymers, cellulose acylates, polyesters and polycarbonates

[8] The liquid crystal display device according to any one of [1] to [7], wherein the retardation layer is a film prepared by allowing a melt in a film form of a composition comprising a thermoplastic polymer to pass through two rolls having a different circumferential speed from each other.

[9] The liquid crystal display device according to any one of [1] to [8], wherein the retardation layer is a stretched film.

[10] The liquid crystal display device according to any one of [1] to [9], wherein the retardation layer comprises a plurality of layers.

[11] The liquid crystal display device according to any one of [1] to [10], wherein $\Delta n \cdot d$ which is the product of a thickness $d$ and a birefringence $\Delta n$ of the liquid crystal layer meets following relation:

200 nm ≤ $\Delta n \cdot d$ ≤ 600 nm

[12] The liquid crystal display device according to any one of [1] to [11], wherein in a state where a drive voltage is not applied, liquid crystal molecules in the liquid crystal layer are aligned parallel to the substrate plane, and the liquid crystal layer has a twist angle between the first substrate and the second substrate is from 0° to 134°.

According to the invention, it is possible to provide a liquid crystal display device with an improved viewing angle characteristic.

Figure 1:
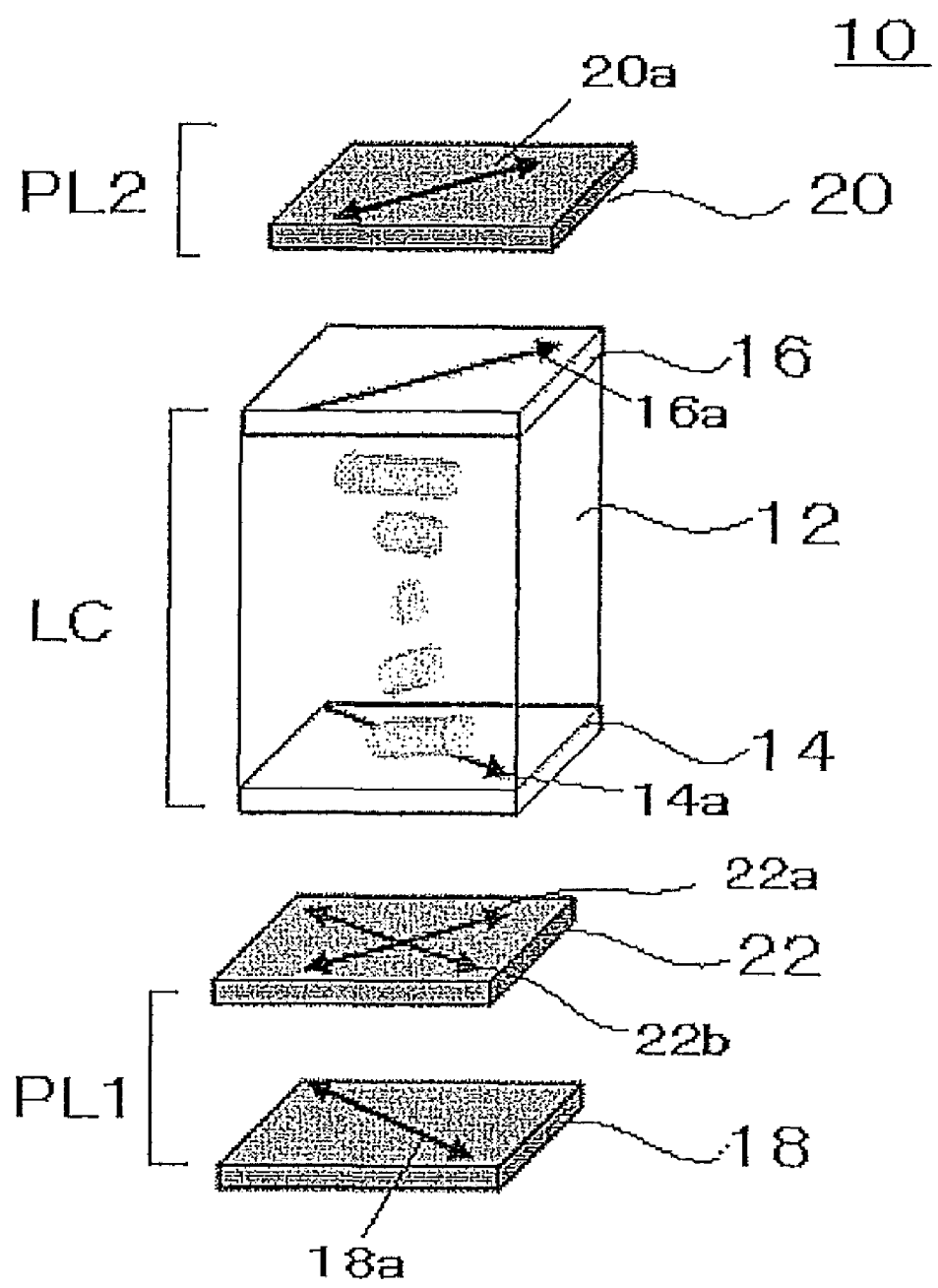
FIG. 1 is a schematic view showing a configuration of an example of a liquid crystal display device of the invention.

Meanings of the respective symbols in the drawings are as follows.

10, 10', 10", 10'": Liquid crystal display device
12: Liquid crystal layer
14, 16: Cell substrate
14a, 16a: Alignment process direction applied within substrate
18, 20: Polarizing layer
18a, 20a: Absorption axis of polarizing layer
22, 22', 24, 24': Retardation layer
22a, 22'a, 24a, 24'a: In-plane slow axis of retardation layer
22b, 22'b, 24b, 24'b: Machine direction (MD) of retardation layer
LC: Liquid crystal cell
PL1, PL1', PL2". PL2'": Polarizing plate

DETAILED DESCRIPTION OF THE INVENTION

The invention is hereunder described in more detail. Note that, in this patent specification, any numerical expressions in a style of "... to ..." will be used to indicate a range including the lower and upper limits represented by the numerals given before and after "to", respectively.

In this description, Re($\lambda$) and Rth($\lambda$) are retardation in plane (nm) and retardation along the thickness direction (nm), respectively, at a wavelength of $\lambda$. Re($\lambda$) is measured by applying light having a wavelength of $\lambda$ nm to a sample such as a film in the normal direction thereof, using KOBRA 21ADH or WR (by Oji Scientific Instruments).

When a sample to be analyze by a monoaxial or biaxial index ellipsoid, Rth($\lambda$) of the film is calculated as follows. The selectivity of the measurement wavelength $\lambda$ nm may be conducted by a manual exchange of a wavelength-filter, a program conversion of a measurement wavelength value or the like.

Rth($\lambda$) is calculated by KOBRA 21ADH or WR based on six Re($\lambda$) values which are measured for incoming light of a wavelength $\lambda$ nm in six directions which are decided by a 10° step rotation from 0° to 50° with respect to the normal direction of a sample film using an in-plane slow axis, which is decided by KOBRA21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth($\lambda$) of the film is calculated by KOBRA21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (10) and (11):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (10)$$

$$Rth = \left(\frac{nx + ny}{2} - nz\right) \times d \quad (11)$$

wherein Re($\theta$) represents a retardation value in the direction tilted by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then Rth($\lambda$) of the film may be calculated as follows:

Re($\lambda$) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

It is to be noted that, in the description, Re and Rth without any notation of the measurement-wavelength mean the values measured at 550 nm.

It is also to be noted that, in the description, the term "principal axis" means a principal index axis nz in the film thickness direction of principal index axes, nx, ny and nz of an index ellipsoid calculated by KOBRA 21ADH or WR, unless otherwise indicated.

In this description, the numerical data, the numerical range and the qualitative expression (for example, "equivalent", "same", etc.) indicating the optical properties of constitutive components such as retardation layer liquid-crystal layer and others should be so interpreted as to indicate the numerical data, the numerical range and the qualitative expression that include the error range generally FIG. 1 is a schematic view showing conceptually a configuration of an example of the liquid crystal display device of the invention.

A liquid crystal display device 10 shown in FIG. 1 includes a pair of polarizing layers 18 and 20 disposed so that respective absorption axes thereof are orthogonal to each other; a liquid crystal cell LC having a liquid crystal layer 12 disposed between a first substrate 14 and a second substrate 16, which are disposed facing each other between the pair of the polarizing layers 18 and 20; and a retardation layer 22 disposed between the polarizing layer 18 and the liquid crystal cell LC.

The liquid crystal cell LC s a liquid crystal cell employing a TN mode, and an electrode layer is provided on each of the facing planes of the first substrate 14 and the second substrate 16. As an example, plural pixel electrodes are respectively provided with plural TFTs corresponding thereto, plural gate wirings for feeding a gate signal to TFT of each line and plural data wirings for feeding a data signal to TFT of each row; and the plural pixel electrodes are respectively connected to TFTs corresponding to the pixel electrodes. Also, horizontal alignment films having been subjected to an alignment process in directions 14a and 16a which are substantially orthogonal to each other are provided on the respective opposing planes of the pair of the opposing substrates 14 and 16 so as to cover the electrode layer. The liquid crystal layer 12 is a layer obtained by filling a nematic liquid crystal material having positive dielectric anisotropy; and a liquid crystal molecule thereof is defined on the alignment direction in the vicinity of each of the first substrate 14 and the second substrate 16 by the horizontal alignment film, and when an electric field is not applied between the electrode layers, as shown in FIG. 1, the liquid crystal molecules are twist aligned at a twist angle of substantially 90° between the substrates 14 and 16. On the other hand, when a voltage for displaying black is applied between the electrodes, the liquid crystal molecules become to stand up vertically relative to the planes of the substrates 14 and 16 and are aligned at a prescribed average tilt angle θ (from about 60° to 90°). In that state, the polarization state of light which propagates in the liquid crystal layer is different due to the alignment of the liquid crystal molecules between the case where light comes into the liquid crystal layer along the normal line direction and the case where light comes into the liquid crystal layer in the oblique direction. As a result, the contrast is lowered depending upon the viewing angle, or grayscale inversion or color shift is generated. In the liquid crystal display device 10 shown in FIG. 1, the viewing angle dependency of display characteristics such as contrast is reduced by the retardation layer 22, thereby improving the viewing angle characteristic.

Δn·d which is the product of a thickness d and a birefringence Δn of the liquid crystal layer 12 is generally from about 300 to 600 nm in case of a TN mode, and from about 200 to 350 nm in case of an ECB mode, respectively. In the invention, what the Δn·d of the liquid crystal layer is satisfied with the following relation is preferable because an effect for enlarging a viewing angle is attainable in each of the TN and ECB modes.

$$200\ nm \leq \Delta n \cdot d \leq 600\ nm$$

The Δn·d is more preferably from 380 to 480 nm in case of a TN mode, and from 250 to 320 nm in case of an ECB mode, respectively.

It is preferable that the liquid crystal layer 12 is a multi-gap liquid crystal layer whose thickness is different among sub pixel regions of RGB from each other. For example, the liquid crystal layer can be formed as a multi-gap liquid crystal layer in which the thickness of the color filter is not uniform, but the thickness of each of an R sub pixel, a G sub pixel and a B sub pixel is made different from each other. As an example, there is a configuration where Δn·d(R) of a liquid crystal layer corresponding to the R sub pixel, Δn·d(G) of a liquid crystal layer corresponding to the G sub pixel and Δn·d(B) of a liquid crystal corresponding to the B sub pixel are satisfied with the relationship: Δn·d(B)<Δn·d(G)<Δn·d(R). According to this example, a color image having high contrast and color reproducibility can be displayed over a wide viewing angle.

On the other hand, by using, as the liquid crystal material, a liquid crystal material in which Δn has wavelength dependency and Δn(R) to R light, Δn(G) to G light and Δn(B) to B light are satisfied with the relationship: Δn(B)<Δn(G)<Δn(R), even when the thickness of the color filter is uniform, the same effects are obtainable.

The liquid crystal display device shown in FIG. 1 is of a normally white mode, and the pair of the polarizing layers 18 and 20 (the lower side polarizing plate 18 and the upper side polarizing layer 20 will be hereunder referred to as "first polarizing layer 18" and "second polarizing layer 20", respectively) are disposed so that the respective absorption axes 18a and 20a are substantially orthogonal to each other as shown in FIG. 1.

The retardation layer 22 is disposed between the liquid crystal cell LC and the first polarizing layer 18. The retardation layer 22 meets the following optical characteristics.

(1) Retardation in plane at a wavelength of 550 nm, Re(550), is from 25 nm to 230 nm (more preferably from 60 to 230 nm);
(2) R[40°] of the retardation layer is from 0 nm to 300 nm (more preferably from 0 to 240 nm); where R[40°] of the retardation layer is a retardation measured for incident light having a wavelength of 550 nm coming in a direction tilted by 40 degrees toward the tilt direction of the retardation layer relative to the normal line of the retardation layer, and the direction is in a plane (incident plane) which includes the normal line and the tilt direction of the retardation layer, and (3) The ratio of R[+40°] to R[−40°] meets 1<R[+40°]/R[−40°], provided that R[+40°]>R[−40°], where R[+40°] of the retardation layer is retardation measured for incident light having a wavelength of 550 nm coming in a first direction tilted by 40 degrees toward the tilt direction of the retardation layer relative to the normal line of the retardation layer; and retardation R[−40°] of the retardation layer is retardation measured for incident light having a wavelength of 550 nm coming in a second direction tilted by 40 degrees oppositely toward the tilt direction of the retardation layer relative to the normal line of the layer, provided that the first and second directions are directions in a same plane (incident plane) that includes the normal line and the tilt direction of the retardation layer.

In this description, "direction tilted by $\theta°$ relative to the normal line of the retardation layer" is defined as a direction tilted by $\theta°$ relative to the normal direction of the retardation layer to the tilt direction of the retardation layer. Specifically, the normal direction of the retardation layer is the direction in which the tilt angle ($\theta$) is 0°, and any direction in the plane of the retardation layer is the direction in which the tilt angle ($\theta$) is 90°.

Figure 5:
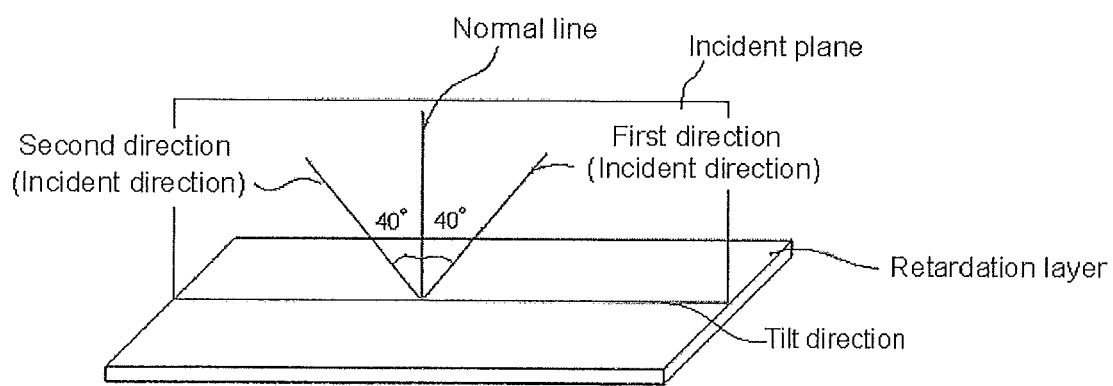
FIG. 5 is a schematic view which is used for explaining the definition of optical characteristics of a retardation layer.

FIG. 5 is a schematic view showing an example of the relationship among a tilt direction of a retardation layer, an incident plane and an incident direction in measuring R[+40°] and R[−40°]. The measurement of R[+40°] and R[−40°] may be achieved from any of incident directions 1 and 2 and is determined so that the relationship: R[+40°]>R[−40°] is satisfied. Also, the term "R[40°]" in (2) means either R[+40°] or R[−40°], and what R[40°] is from 0 nm to 300 nm means that both of R[+40°] and R[−40°] fall within the range of from 0 to 300 nm.

In this description, R[0°] (=Re), R[+40°] and R[−40°] of the retardation layer such as a film means the retardation value measured in the normal direction of the retardation layer (at a tilt angle of 0°), the retardation value measured in the direction tilted by 40 degrees relative to the normal line to the tilt direction (at a tilt angle of 40 degrees), and the retardation value measured in the direction tilted by −40 degrees relative to the normal line to the tilt direction (at a tile angle of −40 degrees), respectively, at a wavelength of 550 nm.

The tilt direction is determined as follows:

(1) The slow axial direction in the plane of the retardation layer is taken as 0°, and the fast axial direction in the plane is taken as 90°. A temporary tilt direction is set at intervals of 0.1° between 0° and 90°.

(2) R[+40°] and R[−40°] are measured in the directions tilted by +40 degrees and −40 degrees relative to the normal line of the film to each temporary tilt direction, and |R[+40°]−R[−40°]| of each temporary tilt direction is computed.

(3) The direction in which the value of |R[+40°]−R[−40°]| is the largest is taken as the tilt direction.

That is, in the invention, "having a tilt direction" means existing a direction where the value of |R[+40°]−R[−40°]| is the largest.

In this description, Rth of the film is computed with KOBRA 21ADH or WR in the tilt direction of the retardation layer such as film.

The fluctuation in Re, R[+40°] and R[−40°] may be determined as follows. Ten points are randomly sampled in the center part of the retardation layer, as spaced from each other by at least 2 mm, and Re, R[+40°] and R[−40°] are measured at the sampled sites according to the method mentioned in the above. The difference between the maximum value and the minimum value is taken as the fluctuation in Re, R[+40°] and R[−40°] of the retardation layer. In the invention, the average of the data at those ten sites is taken as Re, R[+40°] and R[−40°].

The fluctuation in the slow axis and the Rth to be mentioned below may be determined similarly to the above.

In the liquid crystal display device 10, by using the optical characteristics of the retardation layer 22 which is satisfied with the foregoing optical characteristics (1) to (3), a lowering of the contrast to be caused depending upon the viewing angle and the generation of grayscale inversion or color shift are suppressed, and the viewing angle dependency of display characteristics such as contrast is reduced, thereby improving the viewing angle characteristic. From these viewpoints, it is preferable that the retardation layer 22 has an Re(550) of from 25 to 230 nm, an R[40°] of from 0 to 300 nm and an R[+40°]/R[−40°] ratio of equal to or more than 1.2; and it is more preferable that the retardation layer 22 has an Re(550) of from 60 to 150 nm, an R[40°] of from 0 to 240 nm and an R[+40°]/R[−40°] ratio of from 1.2 to 4.9.

The film which is satisfied with the foregoing optical characteristics (1) to (3) can be prepared according to a method as described later, specifically by allowing a polymer melt in a film form to pass through two rolls having a different circumferential speed from each other. Also, the foregoing optical characteristics (1) to (3) can be attained by a film in which the principal axis of an index ellipsoid is tilted in the thickness direction. Also, the foregoing optical characteristics (1) to (3) can be attained by a retardation layer formed by fixing a liquid crystal composition containing a discotic compound in a hybrid alignment state and then curing it. Also, the foregoing optical characteristics (1) to (3) can be attained by any laminate thereof. In an embodiment where the retardation layer 22 is composed of a polymer film, it can also be used as a protective film by sticking it to the polarizing layer 18 upon coming into contact therewith. In this embodiment, a liquid crystal display device can be produced by preparing a polarizing plate PL1 in FIG. 1 and sticking it to the liquid crystal cell LC.

The polymer film which is satisfied with the foregoing characteristics which can be used as the retardation layer 22 can be prepared by melt extruding an amorphous thermoplastic polymer with positive inherent birefringence in a film state and then allowing the film to pass through rolls having a different circumferential speed from each other. A producing method of a polymer film which can be used for the retardation film is described later.

Next, the optical axis relationship of the liquid crystal display device shown in FIG. 1 is described.

In the liquid crystal display device 10 shown in FIG. 1, the alignment process direction (usually a rubbing axis) 14a of the alignment film provided on the facing plane of the first substrate 14 is located in a direction rotated clockwise by 45° as seen from the display plane side (upper side in the drawing) relative to the left and right direction of a screen of the liquid crystal display device; and the alignment process direction 16a of the alignment film located on the opposing plane of the second substrate 16 is located in a direction rotated counter-clockwise by 45° as seen from the observer side (upper side in the drawing) relative to the left and right direction of a screen of the liquid crystal display device. At the time when a voltage is not applied, since the liquid crystal molecules in the vicinity of an interface of the alignment film are aligned so that their long axis directions are along with the alignment process direction, it is a twisted alignment state with a twist angle of substantially 900 clockwise as seen from the display plane side.

Also, the first polarizing layer 18 is disposed so that its absorption axis 18*a* is parallel to the alignment process direction 14*a* of the alignment film. Also, an in-plane slow axis 22*a* of the retardation layer 22 is substantially orthogonal to the absorption axis 18*a* of the first polarizing layer 18 and the alignment process direction 14*a* of the alignment film of the first substrate 14. Also, the retardation layer 22 is disposed so that the tilt direction of the principal axis in the retardation layer is approximately parallel to the alignment treatment direction 14*a*. The embodiments having the configuration which meets the above mentioned relations may achieve improving viewing angles and are preferable.

Figure 2:
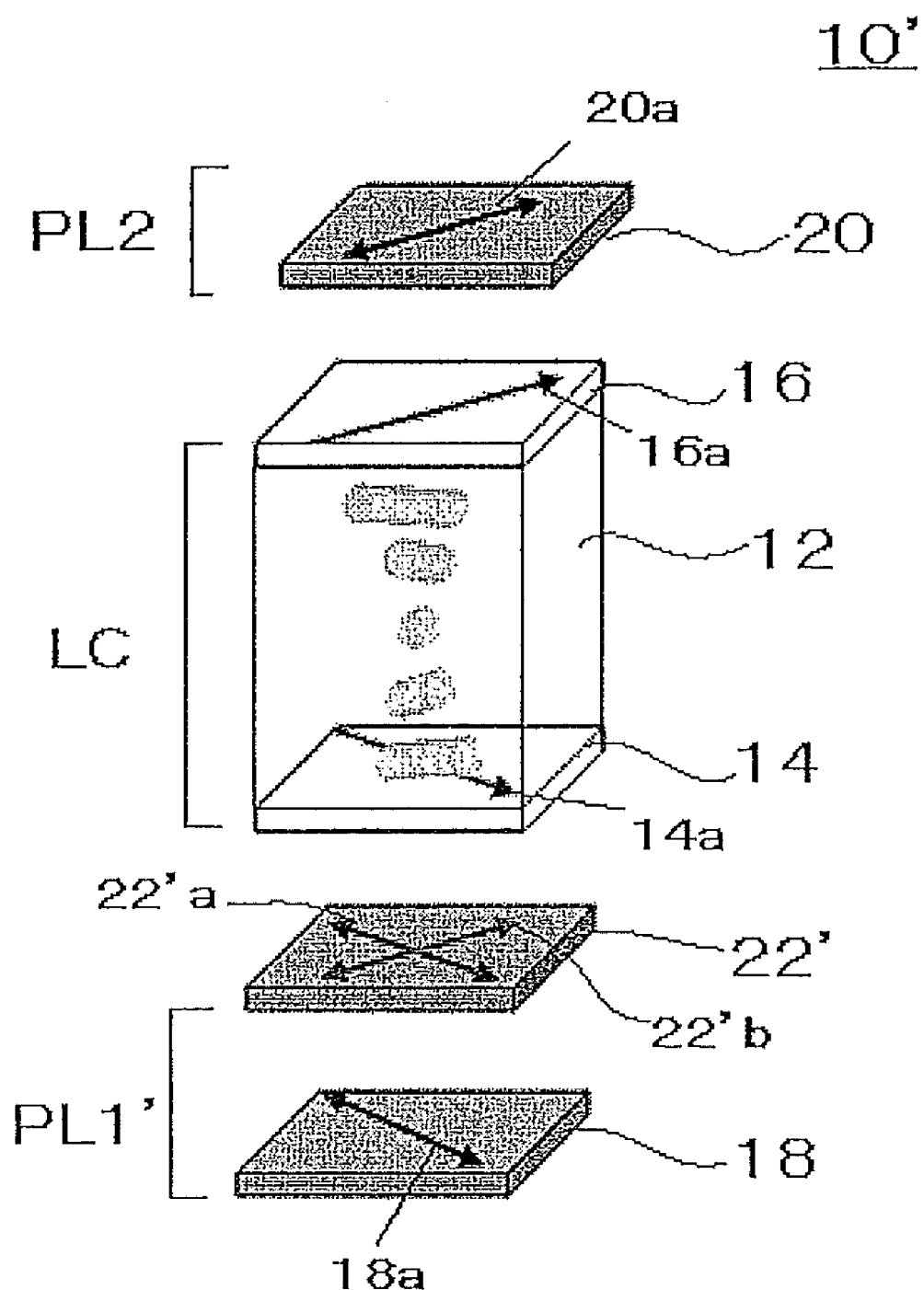
FIG. 2 is a schematic view showing a configuration of other example of a liquid crystal display device of the invention.

FIG. 2 is a schematic view schematically showing other configuration example of the liquid crystal display device of the invention. In FIG. 2, the same members as in FIG. 1 are given the same numbers, and detailed explanations thereof are omitted.

In a liquid crystal display device 10' shown in FIG. 2, an in-plane slow axis 22*a*' of a retardation layer 22' is deviated by 90° from the in-plane slow axis 22*a* of the retardation layer 22 of the liquid crystal display device 10 shown in FIG. 1. That is, the in-plane slow axis 22*a*' of the retardation film 22' is substantially parallel to the absorption axis 18*a* of the first polarizing layer 18 and the alignment process direction 14*a* of the alignment film of the first substrate 14. Also, the retardation layer 22' is disposed so that the tilt direction of the principal axis in the retardation layer is approximately orthogonal to the alignment treatment direction 14*a*. The embodiments having the configuration which meets the above mentioned relations may achieve improving viewing angles and are preferable.

As described above, the film which is satisfied with the foregoing optical characteristics can be prepared by allowing a melt in a film form to pass through two rolls having a different circumferential speed from each other. In that case, the principal axis of the film is tilted toward the machine direction of the film (hereinafter referred to as "MD direction"). In the continuous production, the film is prepared by allowing a melt in a film form to pass through two rolls having a different circumferential speed from each other and subsequently subjecting it to a stretch process or the like. As to the principal axis of a polymer film prepared by this method, a projection axis projected on the layer plane is parallel to the MD direction and orthogonal to the in-plane slow axis. On the other hand, since a continuously produced longitudinal polarizing layer usually has an absorption axis in a direction parallel to the MD direction, it is good in adaptability to manufacture from the standpoint that the polarizing plate PL1 in FIG. 1 can be manufactured by sticking while making an MD direction 22*b* of the retardation layer 22 in conformity with the MD direction of the polarizing layer 18. That is, the example of FIG. 1 is more excellent than the example of FIG. 2 from the standpoints that the film can be produced stably and continuously and that the production cost is low.

Figure 3:
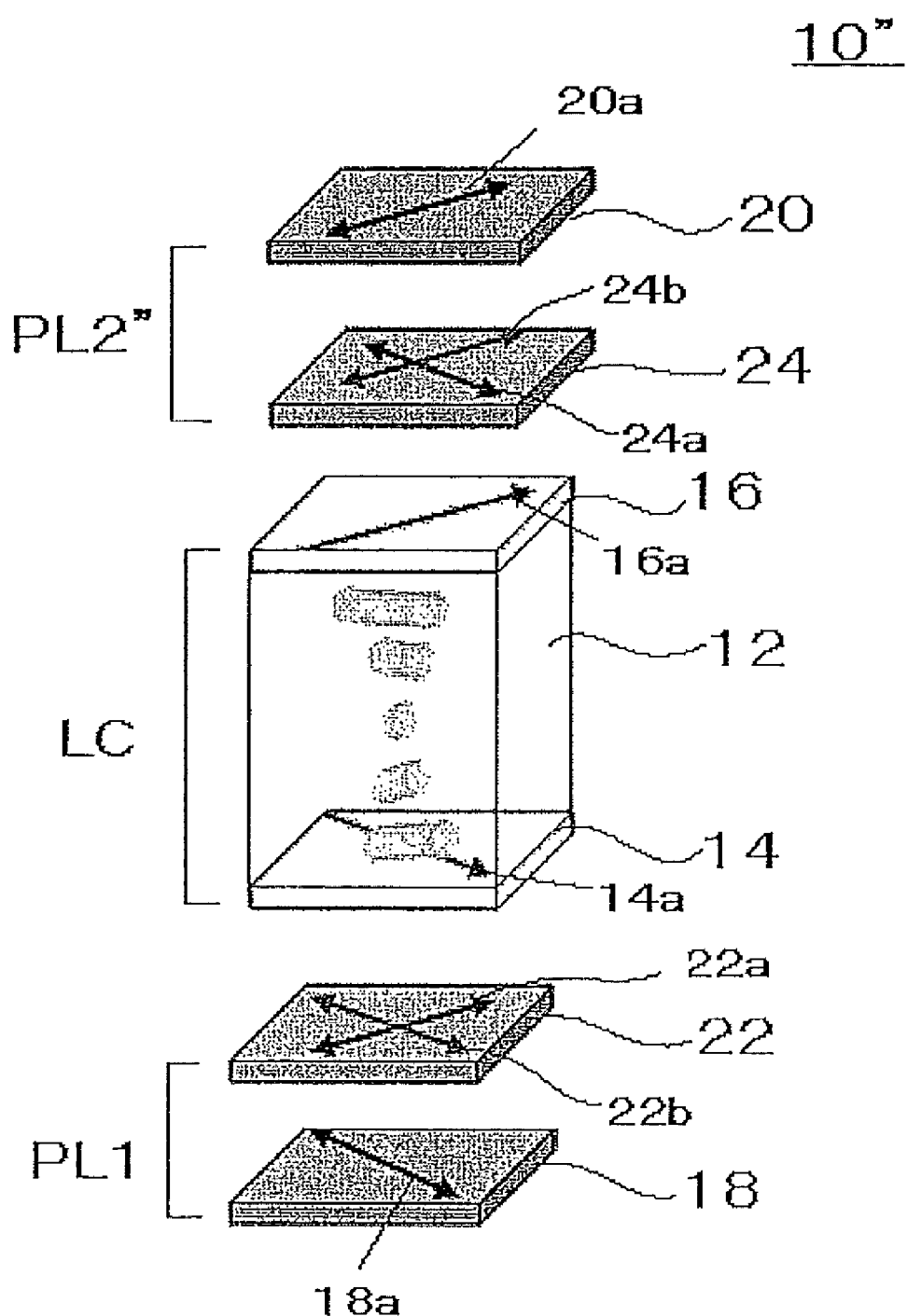
FIG. 3 is a schematic view showing a configuration of other example of a liquid crystal display device of the invention.
Figure 4:
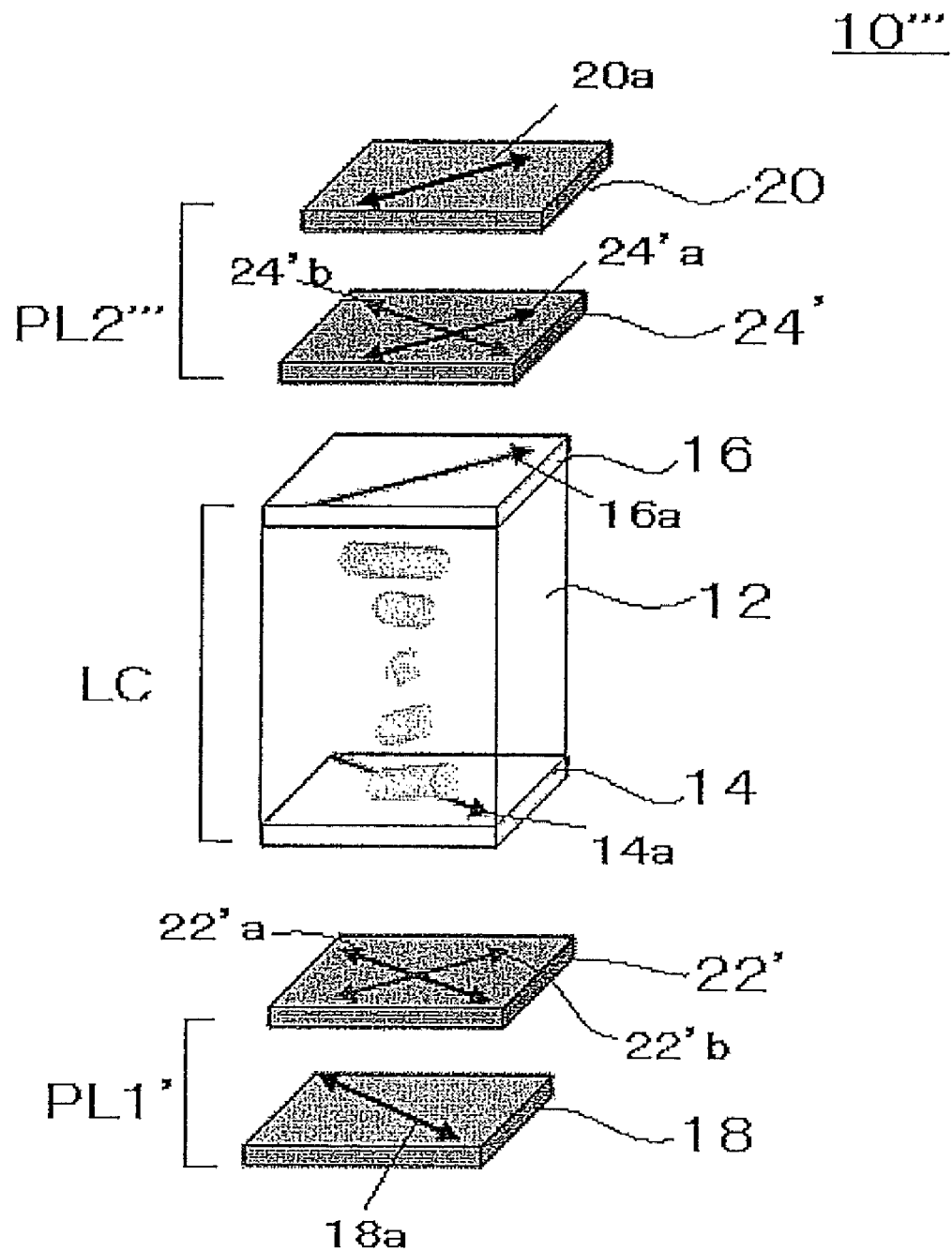
FIG. 4 is a schematic view showing a configuration of other example of a liquid crystal display device of the invention.

Each of FIGS. 3 and 4 schematically shows other configuration example of the liquid crystal display device of the invention. Liquid crystal display devices 10" and 10''' shown in FIGS. 3 and 4 further include retardation layers 24 and 24', respectively which are satisfied with the foregoing optical characteristic requirements (1) to (3) between the polarizing layer 20 and the cell substrate 16 in the liquid crystal display device shown in FIGS. 1 and 2. In embodiments where each of the retarding layer 24 and the retardation layer 24' is composed of a polymer film, similar to the polarizing plate PL1, each of the retardation layer 24 and the retardation layer 24' is also used as a protective film thereof and stuck to the polarizing layer 20 upon coming into contact therewith, thereby preparing polarizing plates PL2" and PL2''', respectively, which can be then stuck to the liquid crystal cell LC.

In the embodiments of FIGS. 3 and 4, the same polymer film may be used as the retardation layer 24 and the retardation layer 22 and as the retardation layer 24' and the retardation layer 22', respectively. For example, a polymer film having an Re(550) of from 25 to 230 nm and an R[40°] of from 0 to 300 nm can be used for the retardation layer 22 and the retardation layer 24 and for the retardation layer 22' and the retardation layer 24', respectively. In the embodiments of FIGS. 3 and 4, it is preferable that the retardation layers 22 and 24, and the retardation layers 22' and 24' are disposed so that in-plane slow axes 22*a* and 24*a*, and in-plane slow axes 22'*a* and 24'*a* are orthogonal to each other, respectively.

In terms of viewing angle characteristics, the embodiments employing two retardation layers satisfying the above mentioned relations, (1)-(3), which are respectively disposed above and below the liquid crystal cell as shown in FIGS. 3 and 4, are more preferable than the embodiments employing one retardation layer satisfying the above mentioned relations, (1)-(3), as shown in FIGS. 1 and 2; and according to the embodiments shown in FIGS. 3 and 4, preferably, two of same polymer films are used as two retardation layers. In addition, in terms of productivity, the embodiments shown in FIG. 3 which may be prepared by bonding a retardation layer and a polarizing layer so as to match their MD directions are more preferable than the embodiments shown in FIG. 4.

In the above paragraphs, regarding the embodiments wherein the in-plane slow axis of the retardation layer is orthogonal to the absorption axis of the polarizing layer disposed at a closer position to the retardation layer, or that is, an in-plane slow axis of the retardation layer is disposed in the direction of 90 degrees relative to an absorption axis of the polarizing layer disposed at a closer position to the retardation layer, the effect of the invention was explained, however, regarding not only such embodiments but also all of the embodiments wherein an in-plane slow axis of the retardation layer is within the direction of 90±40 degrees relative to an absorption axis of the polarizing layer disposed at a closer position to the retardation layer, the effect of the invention can be obtained as shown in Examples.

In the above paragraphs, regarding the embodiments employing a TN (Twisted Nematic) mode with a twist angle of 90 degrees, the effect of improving the displaying performances was explained, however, regarding not only such embodiments but also the embodiments employing TN (Twisted Nematic) mode with a twist angle equal to or smaller than 134 degrees (preferably smaller than 134 degrees) or employing an ECB (Electrically Controlled Birefringence) mode with untwisted alignment, the effect of improving the displaying performances can be obtained as shown in Examples.

In an embodiment of an ECB mode liquid crystal display device, the Δn·d of the liquid crystal layer in the liquid crystal cell is made to fall within the range of from about 200 to 350 nm; and though the directions of an alignment process to be applied to the inside of a pair of cell substrates are parallel and not intersected with each other, the rubbing directions are different by 180° between the upper and lower substrates. That is, at the time when an electric field is applied, a liquid crystal in a liquid crystal cell is not twist aligned. Also, a pair of polarizing plates is disposed so that absorption axes thereof are orthogonal to each other, and the respective absorption axes are disposed at 45° relative to the alignment process direction applied to the inside of a cell substrate to be disposed at a closer position. The relationship between an in-plane slow axis of a retardation layer and the absorption axis of a polarizing layer to be disposed at a closer position is approximately 45°. It is preferable that the retardation layer which is used in the liquid crystal display device of an ECB mode has an Re(550) of from about 25 to 300 nm and an R[40°] of from about 0 to 300 nm.

The respective members which are used in the liquid crystal display device of the invention are hereunder described.

Retardation Layer:

In the invention, a retardation layer which is satisfied with the following optical characteristics is used.

(1) Re(550) is from 25 nm to 230 nm;
(2) R[40°] of the retardation layer is from 0 nm to 300 nm (more preferably from 0 to 240 nm); where R[40°] of the retardation layer is a retardation measured for incident light having a wavelength of 550 nm coming in a direction tilted by 40 degrees toward the tilt direction of the retardation layer relative to the normal line of the retardation layer, and the direction is in a plane (incident plane) which includes the normal line and the tilt direction of the retardation layer, and
(3) The ratio of R[+40°] to R[−40] meets 1<R[+40°]/R[−40°], provided that R[+40°]>R[−40°], where R[+40°] of the retardation layer is retardation measured for incident light having a wavelength of 550 nm coming in a first direction tilted by 40 degrees toward the tilt direction of the retardation layer relative to the normal line of the retardation layer; and R[−40°] of the retardation layer is retardation measured for incident light having a wavelength of 550 nm coming in a second direction tilted by 40 degrees oppositely toward the tilt direction of the retardation layer relative to the normal line of the layer, provided that the first and second directions are directions in a same plane (incident plane) that includes the normal line and the tilt direction of the retardation layer.

The retardation layer is a retardation layer which is satisfied with the foregoing optical characteristic (3), namely the polar angle dependency of retardation is asymmetric centering on the normal line direction (polar angle: 0°) relative to incident light of at least one incident plane including a normal line of the layer plane. An example of the retardation layer is a film in which a principal axis thereof is tilted in the thickness direction. Here, the term "principal axis" of the film refers to a principal index axis nz in the film thickness direction of principal index axes, nx, ny and nz of an index ellipsoid calculated by KOBRA21ADH or WR. Also, it is meant by the terms "tilted in the thickness direction" that the principal axis is tilted by an angle $\theta t°$ ($0°<\theta t<90°$; $\theta t$ will be hereinafter referred to as "tilt angle") toward the tilt direction relative to the normal line direction of the film plane while defining an arbitrary direction within the film plane as an tilt direction. It is preferable that the forgoing retardation layer is composed of a film having a principal axis in a direction with a tilt angle of not more than 47° relative to the film plan normal line direction and having R[+40°]/R[−40°] of not less than 1.2; it is more preferable that the forgoing retardation layer is composed of a film having a principal axis in a direction with a tilt angle of from 9 to 47° relative to the film plan normal line direction and having R[+40°]/R[−40°] of not less than 1.2; and it is even more preferable that the forgoing retardation layer is composed of a film having a principal axis in a direction with a tilt angle of from 19 to 38° relative to the film plan normal line direction and having R[+40°]/R[−40°] of from 1.5 to 2.5. Also, in the embodiment shown in any of FIGS. 1, 2, 3 and 4, the tilt angle $\theta t$ is preferably not more than 47°, more preferably from 9 to 47°, much more preferably from 19 to 38°; and even much more preferably from 19 to 33°.

Even if using a film having a principal axis, which is tilted relative to the normal line, for optical compensation of in a TN-mode liquid crystal display, unless the film meets the above mentioned condition (1), that is, has Re (550) of equal to or less than 230 nm, the effect of improving the viewing angles may be small; and the productivity of such a film may not be good. And, even if using a film, satisfying the above mentioned condition (1), for optical compensation of in a TN-mode liquid crystal display, unless the film meets the above mentioned condition (3), that is, has R[+40°]/R[−40°] of more than 1, the effect of improving the viewing angles may be small.

In the invention, by combining a plurality of layers, a retardation layer capable of attaining the foregoing required characteristics may be used, namely the retardation layer may be composed of a plurality of layers.

The retardation layer may have constant, regular or reversed wavelength dispersion characteristics (a central wavelength is 550 nm) of retardation; and any embodiments showing constant, regular or reversed wavelength dispersion characteristics may achieve improvement in the viewing angles. However, the coloration in the black state may be varied depending on the wavelength dispersion characteristics of the retardation layer. In order to achieve the ideal black state, the retardation layer, showing reversed wavelength dispersion characteristics of Re, that is, showing lower Re at a wavelength shorter than 550 nm and higher Re at a wavelength longer than 550 nm, compared with Re (550), is preferable.

The tilt angle of the principal axis of the film relative to the film plane can be measured by the following method. An allowable error in the following measurement method will be allowable, too as to the tilt angle of the principal axis of the film which is used in the invention.

As to the tilt angle of the principal axis of the film, the measurement is carried out using KOBRA21ADH or WR (manufactured by Oji Scientific Instruments) while defining the width direction (TD direction) of the film as an tilt axis, and the tilt angle of the principal axis is measured from a retardation at an tilt angle of 40 degrees and a retardation at an tilt angle of −40 degrees. The measured wavelength is defined to be 550 nm.

Also, a fluctuation in the tilt angle of the principal axis can be measured by the following method.

Sampling is carried out at regular intervals in 10 points in the width direction of the film and 10 points of the conveyance direction of the film; the tilt angle of the principal axis is measured by the foregoing method; and a difference between its maximum value and minimum value can be defined as a fluctuation of the tilt angle of the principal axis.

A slow axis angle can be determined by the measurement of the foregoing Re; and its fluctuation can be determined by a difference between a maximum value and a minimum value in measuring 10 points in the width direction of the film and 10 points of the conveyance direction of the film at regular intervals.

In the embodiments, as shown in FIGS. 1 and 2, wherein one retardation layer satisfying the above mentioned conditions (1)-(3) is used for optical compensation of a TN-mode liquid crystal display device, in terms of viewing angle characteristics, preferably, regarding the retardation layer, Re(550) is from 25 to 230 nm, R[40°] is from 0 to 300 nm, and R[+40°]/R[−40°] is equal to or more than 1.2;

more preferably, regarding the retardation layer, Re(550) is from 60 to 150 nm, R[40°] is from 0 to 240 nm, and R[+40°]/R[−40°] is from 1.2 to 4.9; and even more preferably, regarding the retardation layer, Re(550) is from 60 to 150 nm, R[40°] is from 0 to 240 nm, and R[+40°]/R[−40°] is more than 1.2 and equal to or less than 2.5.

In the embodiments, as shown in FIGS. 3 and 4, wherein two retardation layers satisfying the above mentioned conditions (1)-(3) is used for optical compensation of a TN-mode liquid crystal display device, in terms of viewing angle characteristics, preferably, regarding the two retardation layers each, Re(550) is from 25 to 230 nm, R[40°] is from 0 to 300 nm, and R[+40°]/R[−40°] is equal to or more than 1.2;

more preferably, regarding the two retardation layers each, Re(550) is from 60 to 150 nm, R[40°] is from 0 to 240 nm, and R[+40°]/R[−40°] is from 1.2 to 4.9; and even more preferably, regarding the two retardation layers each, Re(550) is from 60 to 150 nm, R[40°] is from 0 to 240 nm, and R[+40°]/R[−40°] is more than 1.2 and equal to or less than 2.5.

The retardation layer(s) used in the foregoing embodiments can be prepared by the following method.

That is, the retardation layer can be prepared according to a method including allowing a melt in a film form of a composition containing a thermoplastic polymer to pass through the nip of two rolls having a different circumferential speed from each other and further stretching the film, if desired. According to this method, it is possible to prepare stably and simply a polymer film which is satisfied with the foregoing optical characteristics (1) to (3). More specifically, by allowing a melt in a film form of a composition comprising a thermoplastic polymer to pass through two rolls having a different circumferential speed from each other, it is possible to stably prepare a film satisfying the foregoing optical characteristics (1) to (3) without any scratched surface and any or much fluctuation of optical properties. In terms of having no or a little fluctuation of optical properties and no scratched surface, the film prepared according to the method described below is distinguishable from any having a tilted principal axis, which are prepared by allowing a non-melt state film to pass through two rolls having a different circumferential speed from each other, described in JP-A-7-333437 and JP-A-6-222213.

According to the production method of the invention, first, a composition containing a thermoplastic polymer (hereinafter this may be referred to as "thermoplastic polymer composition") is melt-extruded. Before the melt-extrusion step, preferably, the thermoplastic polymer composition is pelletized. The pelletizing step may be carried out as follows. The thermoplastic polymer composition is dried, then melted in a double-screw kneading extruder at 150° C. to 300° C., then extruded like noodles, and solidified and cut in air or in water, and thereby giving pellets. After melted in the extruder, the melt may be directly cut while extruded into water through a nozzle to give pellets, according to an underwater cutting method. The extruder usable for pelletization includes a single-screw extruder, a non-engaging counter-rotating double-screw extruder, an engaging counter-rotating double-screw extruder, an engaging uni-rotating double-screw extruder, etc. Preferably, the number of revolutions of the extruder is from 10 rpm to 1000 rpm, more preferably from 20 rpm to 700 rpm. The extruder retention time is preferably from 10 seconds to 10 minutes, more preferably from 20 seconds to 5 minutes.

Not specifically defined, the size of the pellets may be generally from 10 mm$^3$ to 1000 mm$^3$ or so, preferably from 30 mm$^3$ to 500 mm$^3$ or so.

Preferably, prior to feeding the melt of thermoplastic polymer composition, the water content of the pellets is reduced. Preferably, the drying temperature is from 40 to 200° C., more preferably from 60 to 150° C. Accordingly, the water content is preferably reduced to at most 1.0% by mass, more preferably at most 0.1% by mass. The drying may be attained in air, or in nitrogen, or in vacuum.

Next, the dried pellets are fed into the cylinder via the feeding port of the extruder, and kneaded and melted therein. Preferably, the inside of the cylinder comprises, for example, a feeing zone, a pressing zone, and a metering zone in that order from the side of the feeing port. The screw compression ratio of the extruder is preferably from 1.5 to 4.5; the ratio of the cylinder length to the cylinder inner diameter (L/D) is preferably from 20 to 70; and the cylinder inner diameter is preferably from 30 mm to 150 mm. The extrusion temperature of the feeding means (e.g., die) for feeding the thermoplastic polymer composition (hereinafter this may be referred to as "melt temperature") may be determined depending on the melting temperature of the thermoplastic polymer, and in general, it is preferably from 190 to 300° C. or so. Further, for preventing the polymer melt from being oxidized with the remaining oxygen in the extruder, preferably, the extruder is purged with an inert gas (e.g., nitrogen), or is degassed in vacuum via a vent.

Preferably, a filter unit with a breaker plate-type filter or a leaf-type disc filter is fitted to the system for removing impurities from the thermoplastic polymer composition by filtration therethrough. The filtration may be one-stage or multi-stage filtration. Preferably, the filtration accuracy is from 15 μm to 3 μm, more preferably from 10 μm to 3 μm. Stainless steel is preferred for the filter material. The filter constitution includes knitted wire nets, and sintered metal fiber or metal powder articles (sintered filters); and preferred are sintered filters.

For increasing the thickness accuracy by reducing the melt discharge fluctuation, preferably, a gear pump is disposed between the extruder and the thermoplastic polymer composition feeding means (e.g., die). Accordingly, the polymer pressure fluctuation inside the thermoplastic polymer composition feeding means (e.g., die) may be reduced to ±1%. For enhancing the constant feeding capability of the gear pump, there may be employed a method of changing the number of screw revolutions to thereby constantly control the pressure before the gear pump.

In the extruder having the constitution as above, the polymer composition is melted, and if desired, the polymer melt is led to pass through a filter and a gear pump, and thereafter it is continuously transferred to the thermoplastic polymer composition feeding means (e.g., die). The die may be in any type of a T-die, a fishtail die, or a hanger coat die. Preferably, just before the thermoplastic polymer composition feeding means (e.g., die), a static mixer may be disposed for enhancing the uniformity of the polymer temperature. In case where the feeding means is a die, the clearance at the die outlet port part (hereinafter this may be referred to as "lip gap") is generally from 1.0 to 10 times the film thickness, more preferably from 1.5 to 5 times.

Preferably, the die thickness is controllable within a range of from 5 to 50 mm. An automatic thickness-controlling die is also effective, for which the film thickness and the thickness deviation in the downstream area are computed, and the data are fed back to the die for thickness control thereof.

Apart from the single-layer film forming apparatus, a multilayer film forming apparatus is also usable herein.

The residence time taken by the thermoplastic polymer composition to run into the extruder via the feeding port and then go out of it via the feeding means (e.g., die) is preferably from 3 minutes to 40 minutes, more preferably from 4 minutes to 30 minutes.

Next, the melt-state film of the thermoplastic-polymer composition is led to pass between two rolls (such as a combination of a touch roll and a casting roll), and then cooled and solidified to form a film. According to this method, a shearing force is applied to the melt-state film of the thermoplastic polymer composition while the melt-state film is passing between the two rolls having a different circumferential speed from each other, and therefore, a film satisfying the above mentioned relation (III), that is, having an tilted principal axis relative to the normal line direction, can be prepared. Films having a larger value of R[+40°]/R[−40°] may be obtained according to the method employing rolls having a larger diameter for applying larger shearing force. Preferably, the two rolls have a diameter of from 350 mm to 600 (more preferably from 350 to 500 mm). When rolls having such a large diameter are used, then the contact area between the melt-state film and the rolls may be large and the time for which a shear force is applied to the melt-state film is prolonged with the result that films having a large value of R[+40°]/R[−40°] (that is, having a principal axis tilted by larger angle relative to the normal line) can be produced while reducing the fluctuation in the value. The diameters of the two rolls may be equal to or different from each other. According to the method, when the temperature fluctuation of the melt-state film in the width direction is remarkable, it may be difficult to keep uniformity. Therefore, preferably, the temperature fluctuation of the melt-state film in the width direction is reduced just before the melt-state film is brought into contact with at least any one of the two rolls; concretely, the temperature fluctuation of the melt in the width direction is within 5° C. For reducing the temperature fluctuation, preferably, a shielding member having a heat-insulating function or a heat-reflecting function is disposed in at least a part of the air gap to thereby shield the melt from fresh air. When such a heat-insulting member is disposed in the pathway in the manner as above to thereby shield the melt from fresh air, then the melt is protected from being exposed to the external environments such as air, and therefore the temperature fluctuation in the melt-state film in the width direction thereof can be reduced. The temperature fluctuation in the melt-state film in the width direction is preferably within ±3° C., more preferably within ±1° C.

The temperature profile of the film-like melt may be determined, using a contact thermometer or a non-contact thermometer, and, especially, using a non-contact infrared thermometer.

The fed melt of thermoplastic polymer composition may be continuously nip-pressed between the two nip-pressing surfaces of the rolls, to form a film according to a conventional process. In addition, during the step, a pressure of from 5 to 500 MPa is preferably applied to the film-like melt between the nip-pressing surfaces to produce the film. Preferably, the pressure is from 20 to 300 MPa, more preferably from 25 to 200 MPa, even more preferably from 30 to 150 MPa.

For further reducing the fluctuation, there may be employed a method of increasing the adhesiveness of the melt-state film to the casting roll. Concretely, the adhesiveness may be increased by combining an electrostatic method, an air knife method, an air chamber method, a vacuum nozzle method and the like. The adhesiveness increasing technique may be applied to the entire surface of the film-like melt or may be to a part thereof.

Regarding their material, preferably, the two rolls are made of metal, and more preferably they are made of stainless metal. Also preferred are surface-plated rolls. Preferably, the two rolls are made of metal, as their surface roughness is low and therefore the surface of the produced film is hardly scratched. On the other hand, rubber rolls and rubber-lined metal rolls are not preferable since the surface of the produced film is sometimes scratched.

As the touch roll, for example, usable are those described in JP-A 11-314263, 2002-36332, 11-235747, WO97/28950, JP-A 2004-216717, and 2003-145609.

Preferably, one or more casting roll may be used for cooling the film along with the two rolls (such as a combination of a touch roll and a casting roll) between which the melt-state film passes through. The touch roll is generally so disposed that it can touch the first casting roll on the most upstream side (nearer to the thermoplastic polymer composition feeding means, e.g., die). In general, three cooling rolls are used in a relatively popular method, which, however, is not limitative. The distance between the plural casting rolls is preferably from 0.3 mm to 300 mm as a face-to-face gap therebetween, more preferably from 1 mm to 100 mm, even more preferably from 3 mm to 30 mm.

Preferably, the surface of the two rolls (e.g., touch roll, casting roll) has an arithmetic mean height Ra of at most 100 nm, more preferably at most 50 nm, even more preferably at most 25 nm.

The circumferential speed ratio of two rolls means a ratio of a circumferential speed of a first roll to a circumferential speed of a second roll (a circumferential speed of a first roll/a circumferential speed of a second roll), provided that the circumferential speed of the second roll is larger than the circumferential speed of the first roll. As the difference in circumferential speed between the two rolls is larger, that is, the circumferential speed ratio is smaller, a film having a larger value of R[+40°]/R[−40°] may be obtained, that is, a film having a principal axis tilted by at a larger degree relative to the normal line may be obtained. On the other hand, as the difference in circumferential speed between the two rolls is larger, a film having a more scratched may be obtained. More specifically, when a film having a large value of R[+40°]/R[−40°] (that is, a film having a large tilt angle β such as angles equal to or more than 20°) is prepared, the circumferential speed ratio is preferably from 0.55 to 0.80, and more preferably from 0.55 to 0.74. However, in order to avoid scratching its surface, the step is preferably carried out under the following conditions, (i)-(iii).

(i) The temperature is adjusted to the temperature range in which the viscoelasticity of the melt of the thermoplastic polymer composition, just before it is brought into contact with at least any one of the two rolls, satisfies the relation of "loss elastic modulus>storage elastic modulus", preferably, the temperature range equal to or higher than Tg+50° C., and more preferably equal to or more than Tg+70° C. (Tg is a glass transition temperature of the thermoplastic polymer).

(ii) The temperature fluctuation of the melt-state film, which is extruded from the die, in the width direction is reduced by just before the melt-state film is brought into contact with at least any one of the two rolls; concretely, the temperature fluctuation of the melt in the width direction is within 5° C.

(iii) Two rolls whose at least surfaces are made of metal are used.

The two rolls may be driven dependently or independently, but preferably, they are driven independently for retarding the fluctuation in optical properties. According to the invention, as mentioned above, the two rolls are driven at a different circumferential speed from each other; and furthermore, their temperatures may be adjusted to a different temperature from each other. The difference of the temperature between them is preferably from 5 to 80° C., more preferably from 20 to 80° C., and even more preferably from 20 to 60° C. And preferably, each of their temperatures may be adjusted to the range from 60 to 160° C., more preferably from 70 to 150° C., and even more preferably from 80 to 140° C. Such temperature-controlling may be achieved by inletting fluid or air whose temperature is controlled inside of the touch roll.

Preferably, the processed film is trimmed on both sides thereof. The part trimmed away from the film may be recycled as a film-forming material.

Also preferably, the film is knurled on one side or both sides thereof. The height of the knurl formed by the knurling treatment is preferably from 1 μm to 50 μm, more preferably from 3 μm to 20 μm. In the knurling treatment, a protrusion may be formed on one surface or both surfaces. The width of the knurl is preferably from 1 mm to 50 mm, more preferably from 3 mm to 30 mm. The knurling treatment may be carried out at room temperature to 300° C. Also preferably, a laminate film is attached to one surface or both surfaces of the film before winding it. The thickness of the laminate film is preferably from 5 μm to 100 μm, more preferably from 10 μm to 50 μm. Not specifically defined, its material may be any of polyethylene, polyester, polypropylene, etc.

The tension for winding the film is preferably from 2 kg/m-width to 50 kg/m-width, more preferably from 5 kg/m-width to 30 kg/m-width.

For preparing the film satisfying the properties which are required for the retardation layer, after formed according to the above-mentioned method, the film may be stretched and/or relaxed. For example, the film may be processed according to the following process (a) to (i).
(a) Lateral stretching
(b) Lateral stretching→relaxation treatment
(c) Longitudinal stretching→lateral stretching
(d) Longitudinal stretching→lateral stretching→relaxation treatment
(e) Longitudinal stretching→relaxation treatment→lateral stretching→relaxation treatment
(f) Lateral stretching→longitudinal stretching→relaxation treatment
(g) Lateral stretching→relaxation treatment→longitudinal stretching→relaxation treatment
(h) Longitudinal stretching→lateral stretching→longitudinal stretching
(i) Longitudinal stretching→lateral stretching→longitudinal stretching→relaxation treatment Among these processes, the process (a) may be necessary.

A tenter may be used for lateral stretching. Specifically, both sides in the width direction of the film are held with clips, and the film is expanded in the lateral direction. In this case, air at a predetermined temperature may be introduced into the tenter for controlling the stretching temperature. In the description, the term "stretching temperature" (occasionally referred to as "lateral stretching temperature" hereinunder) is defined as the film-surface temperature. The stretching temperatures other than the lateral stretching temperature are also defined as the film-surface temperature. The lateral stretching process is preferably carried out at the stretching temperature of from $(Tg-40)°$ C. to $(Tg+40)°$ C., that is, the stretching temperature in the lateral stretching step is preferably from $(Tg-40)°$ C. to $(Tg+40)°$ C., more preferably from $(Tg-20)°$ C. to $(Tg+20)°$ C., even more preferably from $(Tg-10)°$ C. to $(Tg+10)°$ C. The lateral stretching temperature means the mean temperature between the starting and the ending points of the stretching step.

The stretching time in the lateral stretching step is preferably from one second to ten minutes, more preferably from two seconds to five minutes and even more preferably from five seconds to three minutes. By adjusting the stretching temperature and time to the above mentioned ranges, the tilted structure created in the film through the step of passing the melt-state film between the two rolls may be relaxed hardly, and may be kept at the large degree. That is, a film having a value of $R[+40°]/R[-40°]$ falling within the preferable range may be prepared. The stretching temperature in the lateral stretching step may be controlled by sending air of the desired temperature into the tenter.

The stretching ratio is preferably from 1.01 to 4 times, more preferably from 1.03 to 3.5 times, and even more preferably from 1.1 to 3.0 times. Especially, the lateral-stretching ratio is preferably from 1.51 to 3.0 times.

The lateral stretching may be carried out according to the normal lateral stretching method in which the film is stretched in the width direction by using clips in a tenter, or according to the method described below in which both sides in the width direction of the film are held with clips.
(Simultaneously-Biaxial Stretching Method)

As well as the normal lateral stretching method, according to this method the film is stretched in the width direction by using clips; and, in addition, simultaneously, the film is stretched or relaxed in the longitudinal direction. The methods described in JP-U1-55-93520, JP-A-63-247021, JP-A-6-210726, JP-A-6-278204, JP-A-2000-334832, JP-A-2004-106434, JP-A-2004-195712, JP-A-2006-142595, JP-A-2007-210306, JP-A-2005-22087, JP-A-2006-517608, and JP-A-2007-210306 may be referred to.
(Obliquely-Stretching Method)

As well as the normal lateral stretching method, according to this method the film is stretched in the width direction by using clips; and, in addition, the film is stretched in the oblique direction by making the variation of the moving speed between the right and left clips. According to the method, a film may be stretched in the direction of from 30° to 150°, more preferably of from 40° to 140° and even more preferably from 50° to 130° relative to the MD of the film. The methods described in JP-A-2002-22944, JP-A-2002-86554, JP-A-2004-325561, JP-A-2008-23775, JP-A-2008-110573, JP-A-2000-9912, JP-A-2003-342384, JP-A-2004-20701, JP-A-2004-258508, JP-A-2006-224618, JP-A-2006-255892, JP-A-2008-221834, JP-A-2003-342384 and WO2003/102639 may be referred to.

Before stretched, the film may be preheated, and after stretched, it may be thermally fixed, whereby the Re and/or Rth fluctuation in the stretched film may be reduced and the alignment angle fluctuation with bowing can be reduced. Any one of preheating and thermal fixation may be attained, but preferably, these are both attained. In preheating and thermal fixation, preferably, the film is held with clips, or that is, it is desirable that the preheating, the stretching and the thermal fixation of the film are attained continuously.

The preheating temperature may be higher by from 1° C. to 50° C. or so than the stretching temperature, and is preferably higher by from 2° C. to 40° C., more preferably by from 3° C. to 30° C. Preferably, the heating time is from 1 second to 10 minutes, more preferably from 5 seconds to 4 minutes, even more preferably from 10 seconds to 2 minutes. During the preheating, the tenter width is preferably kept nearly constant. The wording "nearly" is meant to indicate ±10% of the width of the unstretched film.

The thermal fixation may be attained at a temperature lower by from 1° C. to 50° C. than the stretching temperature, more preferably lower by from 2° C. to 40° C., even more preferably by from 3° C. to 30° C. Still more preferably, the thermal fixation temperature is not higher than the stretching temperature and not higher than Tg. The time of the thermal fixation is preferably from 1 second to 10 minutes, more preferably from 5 seconds to 4 minutes, even more preferably from 10 seconds to 2 minutes. During the thermal fixation, the tenter width is preferably kept nearly constant. The wording "nearly" is meant to indicate a range of from 0% of the tenter width after the stretching treatment (the same width as the tenter width after the stretching treatment) to −10% thereof (smaller by 10% than the tenter width after the stretching treatment=width reduction). When the width of the film is expanded more than the stretched width, then it is unfavorable since residual strain may remain in the film.

The reason that such a preheating step or a fixing step can contribute to reducing the fluctuation of the alignment angle, Re or Rth may be as follows:
(i) A film stretched in the width direction tends to get narrower in the orthogonal direction relative to the width direction, that is, the MD (a necking phenomenon). As a result, the film is drawn during stretching and then a stress generates. However, the edges of the film in the width direction are fixed by a clip, and then the edge portion may be subjected to stress rarely and the center portion of the film may be subjected to stress readily. As a result, the stress due to the necking phenomenon may bring about bow-like deformation, that is, bowing may occur. According to this phenomenon, the fluctuation of Re or Rth and the dispersion of the alignment angle may occur.
(ii) When the temperature in the preheating step (that is, before the stretching step) is increased and the temperature in the heating-treatment step (that is, after the stretching step) is decreased, the necking phenomenon more occurs when the film has a lower degree of elasticity, that is, when the film is subjected to the higher-temperature treatment (preheating treatment); and the necking phenomenon less occurs when the film is subjected to the heating-treatment (that is, after stretching). As a result, the bowing-phenomenon may be prevented after the stretching step.

According to such a stretching method, the fluctuation of Re or Rth in the lateral or longitudinal can be reduced by 5% or less, preferably by 4% or less and more preferably by 3% or less. Furthermore, the fluctuation of the alignment angle, 90° or 0°, can be reduced by ±5° or smaller, preferably by ±3° or smaller, and more preferably by ±1° or smaller.

A high-speed stretching step may be carried out. Preferably, the stretching speed is equal to or higher than 20 m/minute, more preferably, equal to or higher than 25 m/minute, and even more preferably equal to or higher than 30 m/minute.

Examples of the film to be used as the retardation layer include films containing a thermoplastic polymer having a positive intrinsic birefringence. The thermoplastic polymer is preferably selected from amorphous polymers. The data of Intrinsic birefringence of various polymers are described in MDS, polymer spec tables, and polymer databases, which may be referred to. If the data is not available from any books or publications, it can be measured according to a prism coupling method. And, according to the invention, the term "amorphous polymer" means any polymers whose film shows no crystal melting peak when it is subjected to a thermal analysis. As far as satisfying the above mentioned properties, any types of polymers are usable. Examples of the thermoplastic polymer include cyclic olefin polymers, cellulose acylates, polyesters and polycarbonates. When the film is prepared according to a melt-extrusion method, preferably, the material which is suitable for the melt-extrusion method is preferable, and from such viewpoint, cyclic olefin polymers and cellulose acylates are preferable. The film may contain just one type of polymer or two or more types of polymers which are different from each other. Among these, cellulose acylates and cyclic olefin polymers prepared according to an addition polymerization are more preferable.

Examples of the cyclic olefin polymers usable in the invention include norbornene-base polymers to be obtained through polymerization of norbornene compounds. The polymers may be produced according to any polymerization method of ring-opening polymerization or addition polymerization.

Addition polymerization and cyclic olefin polymers obtained by it are described, for example, in Japanese Patents 3517471, 3559360, 3867178, 3871721, 3907908, 3945598, JP-T 2005-527696, JP-A 2006-28993, 2006-11361, WO2006/004376, WO2006/030797. Especially preferred are those described in Japanese Patent 3517471.

Ring-opening polymerization and cyclic olefin polymers obtained by it are described, for example, in WO98/14499, Japanese Patents 3060532, 3220478, 3273046, 3404027, 3428176, 3687231, 3873934, and 3912159. Especially preferred are those described in WO98/14499 and Japanese Patent 3060532.

Of such cyclic olefin polymers, more preferred are those to be produced through addition polymerization from the viewpoint of the birefringence development and the melt viscosity thereof; and for example, "TOPAS #6013" (by Polyplastics) can be used.

Examples of cellulose acylate polymers usable in the invention include cellulose acylates where at least a part of three hydroxyl groups in the cellulose unit are substituted with an acyl group. The acyl group (preferably acyl group having from 3 to 22 carbon atoms) may be any of an aliphatic acyl group or an aromatic acyl group. In particular, preferred are cellulose acylates having an aliphatic acyl group, more preferably an aliphatic acyl group having from 3 to 7 carbon atoms, even more preferably an aliphatic acyl group having from 3 to 6 carbon atoms, even more preferably an aliphatic acyl group having from 3 to 5 carbon atoms. One molecule of the polymer may have two or more different types of acyl groups. Preferred examples of the acyl group include an acetyl group, a propionyl group, a butyryl group, a pentanol group, a hexanoyl group. Of those, more preferred are cellulose acylates having one or more selected from an acetyl group, a propionyl group and a butyryl group; even more preferred are cellulose acylates having both an acetyl group and a propionyl group (CAP). CAP is preferred since its production is easy and since its extrusion stability is good.

In case where the film is produced according to a melt extrusion method including the production method of the invention, the cellulose acylate to be used preferably satisfies the following formulae (S-1) and (S-2). The cellulose acylate satisfying the following formulae has a low melting temperature and is improved in point of the melting behavior thereof, and is therefore excellent in the melt extrusion film formation.

$$2.5 \leq X+Y \leq 3.0, \tag{S-1}$$

$$1.25 \leq Y \leq 3.0. \tag{S-2}$$

In formulae (S-1) and (S-2), X means the degree of substitution with acetyl group of the hydroxyl group in cellulose; Y means the total degree of substitution with acyl group of the hydroxyl group in cellulose. "Degree of substitution" as referred to herein means the ratio of substitution of the hydrogen atom of the 2-, 3- and 6-position hydroxyl groups in cellulose. In case where the hydrogen atom of all the 2-, 3- and 6-position hydroxyl groups is substituted with an acyl group, the degree of substitution is 3.

More preferably, the cellulose acylate for use in the invention satisfies the following formulae:

$$2.6 \leq X+Y \leq 2.95,$$

$$2.0 \leq Y \leq 2.95.$$

Even more preferably, the cellulose acylate satisfies the following formulae:

$$2.7 \leq X+Y \leq 2.95,$$

$$2.3 \leq Y \leq 2.9.$$

The mass-average degree of polymerization and the number-average molecular weight of the cellulose acylate are not specifically defined. In general, the mass-average degree of polymerization is from 350 to 800 or so, and the number-average molecular weight if from 70000 to 230000 or so. The cellulose acylate may be produced, using an acid anhydride or an acid chloride as an acylating agent. In a most popular production method on an industrial scale, cellulose obtained from a cotton linter or a wood pulp is esterified with a mixed organic acid ingredient including an organic acid (acetic acid, propionic acid, butyric acid) or its acid anhydride (acetic anhydride, propionic anhydride, butyric anhydride) corresponding to an acetyl group or other acyl group, to produce a cellulose ester. For the method for producing a cellulose acylate satisfying the above formulae (S-1) and (S-2), referred to are the description in Hatsumei Kyokai Disclosure Bulletin (No. 2001-1745, issued on Mar. 15, 2001, by Hatsumei Kyokai), pp. 7-12, and the methods described in JP-A2006-45500, 2006-241433, 2007-138141, 2001-188128, 2006-142800, and 2007-98917.

Examples of the polyester which can be used in the invention include polyesters containing a diol unit having a cyclic acetal framework. Especially, polyesters, containing a dicarboxylic acid-unit and a diol unit having a cyclic acetal framework by from 1 to 80 mol % of the diol unit, are preferable since they show low birefringence.

The polymer film to be used as the retardation layer may contain one or more materials along with the above mentioned thermoplastic polymer(s). Preferably, the polymer film contains one or plural types of the above mentioned thermoplastic polymers as a major ingredient (the term "major ingredient" means a material contained therein at a highest ratio; and when plural thermoplastic polymers are contained therein, the term means the condition that the ratio of the total amount of the plural polymers is highest among any ratios of other materials). Furthermore, for improving the contrast in the normal line direction of a liquid crystal display, a polymer film containing just one material selected from the thermoplastic polymers is preferable. Of course, the film containing just one thermoplastic polymer may contain one or more additives along with the one thermoplastic polymer, and such embodiments containing one or more additives along with the one thermoplastic polymer are not excluded from the embodiments containing just one thermoplastic polymer.

Examples of other materials than the thermoplastic polymer include various additives such as stabilizers, UV absorbents, light stabilizers, plasticizers, fine particles and optical regulators.

Stabilizer:

The film of the invention may contain at least one stabilizer. Preferably, the stabilizer is added before or during hot melting of thermoplastic polymer. The stabilizer is effective for antioxidation of film-constituting ingredients, for trapping the acids formed through decomposition, and for retarding or inhibiting the radical group-caused decomposition under light or heat. The stabilizer is effective for inhibiting degradation such as discoloration or molecular weight reduction to be caused by various types of decompositions including decomposition not as yet clarified, and also inhibiting formation of volatile ingredients. The stabilizer is required to be still effective to exhibit its function, without being decomposed at the polymer melting temperature at which the polymer is formed into a film. Typical example of the stabilizer includes phenol-type stabilizers, phosphite-type stabilizers, thioether-type stabilizers, amine-type stabilizers, epoxy-type stabilizers, lactone-type stabilizers, amine-type stabilizers, metal inactivators (tin-type stabilizers), etc. These are described in JP-A3-199201, 5-1907073, 5-194789, 5-271471, and 6-107854. Preferably, at lest one of phenol-type and phosphite-type stabilizers is used in the invention. Of phenol-type stabilizers, more preferred are those having a molecular weight of at least 500. Preferred phenol-type stabilizers include hindered phenol-type stabilizers.

These materials are readily available as commercial products, and are sold, for example, by the following manufacturers. Ciba Specialty Chemicals provides commercial products of Irganox 1076, Irganox 1010, Irganox 3113, Irganox 245, Irganox 1135, Irganox 1330, Irganox 259, Irganox 565, Irganox 1035, Irganox 1098, Irganox 1425WL. Asahi Denka Kogyo provides commercial products of Adekastab AO-50, Adekastab AO-60, Adekastab AO-20, Adekastab AO-70, Adekastab AO-80. Sumitomo Chemical provides commercial products Sumilizer BP-76, Sumilizer BP-101, Sumilizer GA-80. Shipro Chemical provides commercial products Seenox 326M, Seenox 336B.

As phosphite-type stabilizers, more preferred are the compounds described in JP-A2004-182979, paragraphs [0023]-[0039]. Specific examples of phosphite-type stabilizers include compounds described in JP-A 51-70316, 10-306175, 57-78431, 54-157159, 55-13765. As other stabilizers, preferred are the materials described in detail in Hatsumei Kyokai Disclosure Bulletin (No. 2001-1745, issued on Mar. 15, 2001, by Hatsumei Kyokai), pp. 17-22.

The phosphite-type stabilizers are preferably high-molecular ones for securing the stability thereof at high temperatures, having a molecular weight of at least 500, more preferably at least 550, even more preferably at least 600. Also preferably, the stabilizers have an aromatic ester group as at least one substituent therein. Also preferably, the phosphite-type stabilizers are triesters, more preferably not mixed with impurities of phosphoric acid, monoester or diester. In case where the stabilizer contains such impurities, preferably, the content of the impurities is at most 5% by mass, more preferably at most 3% by mass, even more preferably at most 2% by mass. For the stabilizers of the type, usable are the compounds described in JP-A2004-182979, [0023] to [0039], and also usable are the compounds described n JP-A51-70316, 10-306175, 57-78431, 54-157159, and 55-13765. Preferred examples of phosphite-type stabilizers are mentioned below. However, the phosphite-type stabilizers for use in the invention should not be limited to these.

Asahi Denka provides commercial products of Adekastab 1178, 2112, PEP-8, PEP-24G, PEP-36G, HP-10; and Clariant provides commercial products of Sandostab P-EPQ. Also preferred for use herein are stabilizers having both phenol and phosphite moieties in one molecule. The compounds are described in detail in JP-A10-273494, and their examples are, but not limited thereto, within the scope of the examples of the stabilizers mentioned in the above. Typically, Sumitomo Chemical provides commercial products of Sumilizer GP. Further, Sumitomo Chemical provides other commercial products of Sumilizer TPL, TPM, TPS, TDP. Asahi Denka Kogyo provides commercial products of Adekastab AO-412S.

One or more of the above-mentioned stabilizers may be used herein either singly or as combined. Not detracting from the object of the invention, the amount of the stabilizer to be in the film may be suitably determined. Preferably, the amount of the stabilizer to be added is from 0.001 to 5% by mass relative to the mass of the thermoplastic polymer, more preferably from 0.005 to 3% by mass, even more preferably from 0.01 to 0.8% by mass.

UV Absorbent:

The film of the invention may contain one or more UV absorbents. The UV absorbent is preferably one excellent in the ability of absorbing UV rays having a wavelength of not longer than 380 nm from the viewpoint of antioxidation, and not so much absorbing visible rays having a wavelength of not shorter than 400 nm from the viewpoint of transparency. For example, there are mentioned oxybenzophenone-type compounds, benzotriazole-type compounds, salicylate-type compounds, benzophenone-type compounds, cyanoacrylate-type compounds, and nickel complex-type compounds. Especially preferred UV absorbents are benzotriazole-type compounds and benzophenone-type compounds. Above all, benzotriazole-type compounds are more preferred as causing little unnecessary coloration of cellulose mixed esters. These are described in JP-A60-235852, 3-199201, 5-1907073, 5-194789, 5-271471, 6-107854, 6-118233, 6-148430, 7-11055, 7-11056, 8-29619, 8-239509, and 2000-204173.

The amount of the UV absorbent to be added is preferably from 0.01 to 2% by mass of the thermoplastic polymer, more preferably from 0.01 to 1.5% by mass.

Light Stabilizer:

The film of the invention may contain one or more light stabilizers. The light stabilizer includes hindered amine-type light stabilizers, HALS compounds, more concretely, 2,2,6,6-tetraalkylpiperidine compounds and their acid addition salts and their complexes with metal compounds, as in U.S. Pat. No. 4,619,956, columns 5-11, and U.S. Pat. No. 4,839,405, columns 3-5. Regarding these, Asahi Denka provides commercial products of Adekastab LA-57, LA-52, LA-67, LA-62, LA-77; and Ciba Speciality Chemicals provides commercial products of TINUVIN 765, 144.

One or more of these hindered amine-type light stabilizers may be used either singly or as combined. Needless-to-say, the hindered amine-type light stabilizer may be used, as combined with other additives such as plasticizer, stabilizer, UV absorbent, etc.; and it may be incorporated as a part of the molecular structure in these additives. The amount of the light stabilizer may be determined within a range not detracting from the effect of the invention, and in general, it may be from 0.01 to 20 parts by mass or so relative to 100 parts by mass of the thermoplastic polymer, more preferably from 0.02 to 15 parts by mass or so, even more preferably from 0.05 to 10 parts by mass or so. The light stabilizer may be added in any stage of preparing a melt of thermoplastic polymer composition, and for example, it may be added in the final step of that.

Plasticizer:

The film of the invention may contain a plasticizer. Adding a plasticizer to the film is favorable from the viewpoint of film reformation, for example, for improving the mechanical properties of the film, imparting flexibility to the film, imparting water absorbability to the film or reducing the moisture permeability of the film. In case where the film of the invention is produced according to a melt formation method, a plasticizer may be added to the film for the purpose of depressing the melting temperature of the film-constituting material through plasticizer addition thereto, than the glass transition temperature of the thermoplastic polymer used, or for the purpose of reducing the viscosity of the polymer composition at the same heating temperature than that of the thermoplastic polymer to which the plasticizer is not added. For example, for the film of the invention, preferably used are plasticizers selected from phosphate derivatives and carboxylate derivatives. In addition, also preferably used are polymers produced through polymerization of ethylenic unsaturated monomers and having a weight-average molecular weight of from 500 to 10000, as in JP-A2003-12859, as well as acrylic polymers, acrylic polymers having an aromatic ring in the side branches, and acrylic polymers having a cyclohexyl group in the side branches.

Fine Particles:

The film of the invention may contain fine particles. The fine particles include fine particles of inorganic compounds, and fine particles of organic compounds, and any these are usable herein. The mean primary particle size of the fine particles to be in the thermoplastic polymer for use in the invention is preferably from 5 nm to 3 μm from the viewpoint of reducing the haze of the film, more preferably from 5 nm to 2.5 μm, even more preferably from 10 nm to 2.0 μm. The mean primary particle size of fine particles as referred to herein is determined as follows: A thermoplastic polymer composition is observed with a transmission electronic microscope (having a magnification of from 500,000 to 1,000,000 powers), and the primary particle size of 100 particles is measured, and the data are averaged to be the mean primary particle size of the fine particles. The amount of fine particles to be added is preferably from 0.005 to 1.0% by mass relative to the thermoplastic polymer, more preferably from 0.01 to 0.8% by mass, even more preferably from 0.02 to 0.4% by mass.

Optical Regulator:

The film of the invention may contain an optical regulator. The optical regulator includes a retardation regulator, for which, for example, usable are those described in JP-A2001-166144, 2003-344655, 2003-248117, 2003-66230. The optical regulator, if added to the film, may control the in-plane retardation (Re) and the thickness-direction retardation (Rth) of the film. Preferably, the amount of the optical regulator to be added is from 0 to 10% by mass, more preferably from 0 to 8% by mass, even more preferably from 0 to 6% by mass.

Polarizer:

As describe above, the polymer film to be used as the retardation layer may be bonded to a polarizing film to form a polarizing plate. The polarizing plate may be used in the liquid crystal display of the invention. For example, the polymer film to be used as the retardation layer may be bonded to a polarizing film as a protective film. As the polarizing film, for example, used is one produced by dipping a polyvinyl alcohol film in an iodine solution followed by stretching it. To another surface of the polarizing film, preferably, a protective film may be bonded. Examples of another protective film include polymer films which have been used as a protective film of a polarizing film such as cellulose acylate films and cyclic olefin polymer films.

Examples

The invention is hereunder described in more detail with reference to the following Examples. Materials, use amounts, proportions, process contents, process procedures and the like shown in the following Example can be properly changed so far as the gist of the invention is not deviated. Accordingly, it should not be construed that the scope of the invention is limited to the following specific examples.

1. Preparation of Polymer Film for Retardation Layer:

A pellet of "TOPAS #6013", prepared by Polyplastics Co., Ltd. was used as a cyclic olefin copolymer. It was confirmed by the foregoing method that "TOPAS #6013" has positive inherent birefringence and is an amorphous thermoplastic polymer. Also, this polymer had a glass transition point of 136° C.

Cellulose Acetate Propionate (CAP)

Cellulose acetate propionate (CAP) was prepared according to a method disclosed in Example 1 of JP-A-2006-348123 and pelletized according to the customary manner. A composition of used CAP had a degree of acetylation of 0.15, a degree of propionylation of 2.60, a total degree of acyl substitution of 2.75 and a number average molecular weight DPn of 118. Also, it was confirmed by the foregoing method that this CAP has positive inherent birefringence and is an amorphous thermoplastic polymer. Also, this polymer had a glass transition point of 137° C.

Preparation of Polymer Film for Retardation Film:

The foregoing two kinds of pellets were melt extruded at a molding temperature shown in the following Table 1 and allowed to pass through two rolls (touch roll and chilled roll) driven at a diameter and a circumferential speed ratio shown in the following Table 1, thereby preparing films 2 to 22. Furthermore, the film was laterally stretched at a stretch ratio shown in the following table. A surface temperature of each of the two rolls was controlled and set up at a temperature in the following table.

Also, in each of the obtained films 2 to 22, the polar angle dependency of retardation was asymmetric centering on the normal line direction (polar angle: 0°) relative to incident light of at least one incident plane including a normal line of the layer plane, whereas in a film 1, the polar angle dependency of retardation was symmetric centering on the normal line direction (polar angle: 0°). Also, optical characteristics of each of the films were measured by the foregoing method. The obtained values are shown in the following Table 2.

TABLE 1

|  | Material *2 | Diameter of roll mm | Temperature in forming ° C. | Temperature of touch roll ° C. | Temperature of chilled roll ° C. | Ratio of circumferential speed | Stretching Ration |
|---|---|---|---|---|---|---|---|
| Film 1 *1 | TAC | Prepared according to a solvent casting method (Trade Name "FUJITAC") | | | | | |
| Film 2 | CAP | 350 | 230 | 130 | 130 | 0.9 | 1.2 |
| Film 3 | COP | 350 | 260 | 130 | 130 | 0.8 | 1.4 |
| Film 4 | COP | 350 | 260 | 130 | 130 | 0.95 | 1.2 |
| Film 5 | COP | 350 | 260 | 130 | 130 | 0.9 | 1.3 |
| Film 6 | CAP | 400 | 230 | 135 | 135 | 0.8 | 1.4 |
| Film 7 | COP | 400 | 260 | 120 | 120 | 0.9 | 1.15 |
| Film 8 | COP | 400 | 260 | 120 | 120 | 0.9 | 1.4 |
| Film 9 | COP | 400 | 260 | 120 | 120 | 0.87 | 1.2 |
| Film 10 | COP | 400 | 260 | 120 | 130 | 0.9 | 1.2 |
| Film 11 | COP | 400 | 260 | 115 | 135 | 0.9 | 1.2 |
| Film 12 | COP | 400 | 280 | 130 | 130 | 0.9 | 1.4 |
| Film 13 | COP | 400 | 280 | 130 | 130 | 0.92 | 1.3 |
| Film 14 | CAP | 500 | 230 | 130 | 125 | 0.9 | 1.2 |
| Film 15 | COP | 500 | 260 | 130 | 125 | 0.96 | 1.3 |
| Film 16 | COP | 400 | 280 | 130 | 125 | 0.96 | 1.4 |
| Film 17 | COP | 400 | 260 | 130 | 125 | 0.96 | 1.3 |
| Film 18 | COP | 400 | 260 | 130 | 130 | 0.96 | 1.5 |
| Film 19 | COP | 400 | 260 | 130 | 125 | 0.92 | 1.3 |
| Film 20 | COP | 400 | 260 | 130 | 125 | 0.96 | 1.4 |
| Film 21 | COP | 400 | 260 | 130 | 125 | 0.96 | 1.4 |
| Film 22 | COP | 500 | 230 | 130 | 125 | 0.9 | — |

*1 Film 1 was used as a protective film and as a comparative example
*2 "CAP": Cellulose acetate propionate, "COP": Cyclic olefin polymer.

TABLE 2

|  | Re(550) nm | R[+40°] nm | R[−40°] nm | R[+40°]/ R[−40°] | Relation between axes *2 | θt degree |
|---|---|---|---|---|---|---|
| Film 1 *1 | 0 | 10 | 10 | 1.0 | Orthogonal | 0 |
| Film 2 | 25 | 93 | 0 | ∞ | Orthogonal | 24 |
| Film 3 | 223 | 297 | 190 | 1.6 | Orthogonal | 47 |
| Film 4 | 113 | 158 | 130 | 1.2 | Orthogonal | 9 |
| Film 5 | 97 | 150 | 104 | 1.4 | Orthogonal | 14 |
| Film 6 | 72 | 139 | 56 | 2.5 | Orthogonal | 23 |
| Film 7 | 89 | 148 | 78 | 1.9 | Orthogonal | 24 |
| Film 8 | 101 | 154 | 101 | 1.5 | Orthogonal | 19 |
| Film 9 | 100 | 162 | 89 | 1.8 | Orthogonal | 24 |
| Film 10 | 108 | 172 | 90 | 1.9 | Orthogonal | 29 |
| Film 11 | 96 | 160 | 70 | 2.3 | Orthogonal | 33 |
| Film 12 | 125 | 178 | 106 | 1.7 | Orthogonal | 38 |
| Film 13 | 148 | 190 | 134 | 1.4 | Orthogonal | 47 |
| Film 14 | 65 | 163 | 33 | 4.9 | Orthogonal | 24 |
| Film 15 | 84 | 101 | 87 | 1.2 | Orthogonal | 25 |
| Film 16 | 89 | 140 | 78 | 1.8 | Orthogonal | 26 |
| Film 17 | 145 | 214 | 134 | 1.6 | Orthogonal | 26 |
| Film 18 | 145 | 239 | 114 | 2.1 | Orthogonal | 30 |
| Film 19 | 55 | 75 | 58 | 1.3 | Orthogonal | 17 |
| Film 20 | 61 | 92 | 57 | 1.6 | Orthogonal | 24 |
| Film 21 | 70 | 110 | 61 | 1.8 | Orthogonal | 27 |
| Film 22 | 109 | 142 | 110 | 1.3 | Parallel | 25 |

*1 Film 1 was used as a protective film and as a comparative example
*2 Relation between the in-plane slow axis and the tilt direction of the principal axis

2. Preparation of Polarizing Plate:

A polarizing plate was prepared using each of the films described in the foregoing tables.

Specifically, first of all, iodine was adsorbed on a stretched polyvinyl alcohol film to prepare a polarizing film. The film 1 described in the foregoing tables was stuck onto one surface of this polarizing film, and any one of the films 2 to 22 described in the foregoing tables was stuck onto the other surface of the polarizing film. There were thus prepared polarizing plates P2 to P22.

Also, the film 1 was stuck onto the both surfaces of the polarizing film to prepare a polarizing plate P1.

In all of the polarizing plates P1 to P22, an in-plane slow axis of the film and an absorption axis of the polarizing film were made orthogonal to each other.

3. Preparation of Liquid Crystal Display Device:

As a TN mode liquid crystal cell, a liquid crystal material having positive dielectric anisotropy was injected in vacuo between substrates, thereby preparing a liquid crystal cell having a Δn·d of liquid crystal layer of 400 nm. A liquid crystal having positive dielectric anisotropy, a refractive index anisotropy Δn of 0.0854 (at 589 nm and 20° C.) and a Δ∈ of about +8.5 was used as the liquid crystal material. Also, the liquid crystal cell had a twist angle of 90°, and in sticking later the upper and lower polarizing plates, the rubbing directions of the upper and lower substrates of the liquid crystal cell was made substantially parallel or substantially orthogonal to the absorption axis of the polarizing plate. Also, a cross angle between the absorption axes of the upper and lower polarizing plates was made under a cross nicol condition of approximately 90°.

Each of the prepared polarizing plates P1 to P22 was stuck onto the upper and lower surfaces of this TN mode liquid crystal cell while facing each of the films shown in Table 2 on the liquid crystal cell side, followed by sticking to the liquid crystal cell in a combination shown in the following table. There were thus prepared liquid crystal display devices LCD1, 2, 2', 3, 3', and 4-22. The alignment relationship of the optical axes of the respective members was made identical to that in FIG. 1 or 3.

With respect to LCD1, 2, 2', 3, 3', and 4-22, a combination of the polarizing plates and an evaluation result of a viewing angle characteristic with a white-and-black contrast ratio exceeding 10 (contrast viewing angle characteristic) are shown in the following table. A viewing angle of each of LCD2, 2', 3, 3' and 4-21 was standardized on the basis of a viewing angle exceeding a contrast ratio of 10 of the liquid crystal display device LCD1 using the polarizing plate P1 as a polarizing plate on the display plane side and on the backlight side and then evaluated.

A: All of viewing angles (CR>10) up and down, left and right are 60° or more.

B: All of viewing angles (CR>10) up and down, left and right are 40 degrees or more.

C: In viewing angles (CR>10) up and down, left and right, a viewing angle of less than 40 degrees is present.

TABLE 3

| | Polarizing plate displaying plane side (protective film liquid crystal cell side) | Polarizing plate backlight side (protective film liquid crystal cell side) | Contrast Viewing-Angle characteristics |
|---|---|---|---|
| LCD1 Comparative Example | P1 (Film 1) | P1 (Film 1) | C |
| LCD2 (Example) | P2 (Film 2) | P2 (Film 2) | B |
| LCD2' (Example) | P1 (Film 1) | P2 (Film 2) | B |
| LCD3' (Example) | P3 (Film 3) | P3 (Film 3) | B |
| LCD3' (Example) | P1 (Film 1) | P3 (Film 3) | B |
| LCD4 (Example) | P4 (Film 4) | P4 (Film 4) | B |
| LCD5 (Example) | P5 (Film 5) | P5 (Film 5) | B |
| LCD6 (Example) | P6 (Film 6) | P6 (Film 6) | A |
| LCD7 (Example) | P7 (Film 7) | P7 (Film 7) | A |
| LCD8 (Example) | P8 (Film 8) | P8 (Film 8) | A |
| LCD9 (Example) | P9 (Film 9) | P9 (Film 9) | A |
| LCD10 (Example) | P10 (Film 10) | P10 (Film 10) | A |
| LCD11 (Example) | P11 (Film 11) | P11 (Film 11) | A |
| LCD12 (Example) | P12 (Film 12) | P12 (Film 12) | B |
| LCD13 (Example) | P13 (Film 13) | P13 (Film 13) | B |
| LCD14 (Example) | P14 (Film 14) | P14 (Film 14) | B |
| LCD14' (Example) | P1 (Film 1) | P14 (Film 14) | B |
| LCD15 (Example) | P15 (Film 15) | P15 (Film 15) | B |
| LCD16 (Example) | P16 (Film 16) | P16 (Film 16) | A |
| LCD17 (Example) | P17 (Film 17) | P17 (Film 17) | A |
| LCD18 (Example) | P18 (Film 18) | P18 (Film 18) | A |
| LCD19 (Example) | P19 (Film 19) | P19 (Film 19) | B |
| LCD20 (Example) | P20 (Film 20) | P20 (Film 20) | A |
| LCD21 (Example) | P21 (Film 21) | P21 (Film 21) | A |
| LCD22 (Example) | P22 (Film 22) | P22 (Film 22) | B |

It can be understood from the results shown in the foregoing table that all of the TN mode liquid crystal display devices LCD2, 2', 3, 3', and 4-22 of the Example of the invention are excellent in the viewing angle characteristic as compared with LCD1 of the Comparative Example in which the film used as the retardation film which is not satisfied with the prescribed requires (1) to (3).

The dependency of the contrast viewing-angle characteristics on the angle between the absorption axis in the polarizing plate and the in-plane slow axis of the retardation layer were evaluated; and the result is shown in the table below. More specifically, various TN-mode panels were prepared by disposing each Film No. 9 (Polarizing plate P9) so that the in-plane slow axis was different from each other, and then evaluated in terms of the contrast viewing-angle characteristics. From the data shown in the table, it is understandable that the contrast viewing-angle characteristics targeted by the invention can be obtained even if the shift-angle from the orthogonal relation between the absorption axis in the polarizing plate and the in-plane slow axis of the retardation layer was increased by 40 degrees.

TABLE 4

Examples having Polarizing plate No. 9 on both of the surfaces of a panel respectively:

| | Angle between absorption axis and in-plane slow axis | Contrast viewing-angle characteristics |
|---|---|---|
| Example | 90° (Orthogonal relation) | A |
| Example | 84° (shift[1] by 6° from Orthogonal relation) | A |
| Example | 72°(shift[1] by 18° from Orthogonal relation) | B |
| Example | 60°(shift[1] by 30° from Orthogonal relation) | B |
| Example | 50°(shift[1] by 40° from Orthogonal relation) | B |
| Example | 48°(shift[1] by 42° from Orthogonal relation) | C |
| Comparative Example | 45°(shift[1] by 45° from Orthogonal relation) | C |

The dependencies of the contrast viewing-angle characteristics on the values of Δnd and the twist angle of the liquid crystal layer were evaluated; and the result is shown in the table below. More specifically, various cells having a thickness and a rubbed direction differing from each other were prepared. Then, various liquid crystal devices were prepared by bonding Film No. 9 or Film No. 15 to the cells, respectively; and evaluated in terms of the contrast viewing-angle characteristics. From the data shown in the table, it is understandable that the embodiments, which have Δnd falling within the range from 200 to 600 nm and the twist angle falling within the range from 0 to 134 degrees, can achieve the contrast viewing-angle characteristics targeted by the invention.

TABLE 5

Examples having Polarizing plate No. 9 on both of the surfaces of a panel, respectively:

| Δnd (nm) | Twist angle | Contrast viewing-angle characteristics |
|---|---|---|
| 300 | 36° | C |
| 300 | 46° | B |
| 300 | 90° | B |
| 300 | 130° | B |
| 300 | 134° | C |
| 400 | 50° | C |
| 400 | 60° | B |
| 400 | 82° | A |
| 400 | 114° | A |
| 400 | 134° | B |
| 600 | 36° | C |
| 600 | 64° | B |
| 600 | 90° | B |
| 600 | 114° | B |
| 600 | 134° | C |

TABLE 6

Examples having Polarizing plate No. 15 on both of the surfaces of a panel, respectively:

| Δnd (nm) | Twist angle | Contrast viewing-angle characteristics |
|---|---|---|
| 200 | 0° (ECB) | B |
| 200 | 45° | B |
| 200 | 90° | B |
| 200 | 128° | B |
| 200 | 134° | C |
| 300 | 0° | B |
| 300 | 45° | B |
| 300 | 90° | B |
| 300 | 124° | B |
| 300 | 134° | B |
| 400 | 36° | C |
| 400 | 42° | B |
| 400 | 90° | B |
| 400 | 120° | B |
| 400 | 134° | C |

What is claimed is:

1. A liquid crystal display device comprising:
a pair of polarizing layers disposed so that respective absorption axes thereof are orthogonal to each other;
a liquid crystal cell comprising:
a first substrate and a second substrate being disposed so that they face each other between the pair of the polarizing layers, at least one of which has a transparent electrode, and
a liquid crystal layer disposed between the first substrate and the second substrate; and
a retardation layer disposed between at least one of the pair of the polarizing layers and the liquid crystal cell, wherein
an in-plane slow axis of the retardation layer is within the direction of 90±40 degrees relative to an absorption axis of the polarizing layer disposed at a closer position to the retardation layer;
retardation in plane at a wavelength of 550 nm, Re(550), of the retardation layer meets following relation (I):

$$25 \text{ nm} \leq Re(550) \leq 230 \text{ nm} \tag{I}$$

R[40°] of the retardation layer, which is retardation measured for incident light having a wavelength of 550 nm coming in a direction tilted by 40 degrees toward the tilt direction of the retardation layer relative to the normal line of the retardation layer, the direction being in a plane (incident plane) which includes the normal line and the tilt direction of the retardation layer, meets following relation (II):

$$0 \text{ nm} \leq R[40°] \leq 300 \text{ nm} \tag{II}$$

and
R[+40°] of the retardation layer, which is retardation measured for incident light having a wavelength of 550 nm coming in a first direction tilted by 40 degrees toward the tilt direction of the retardation layer relative to the normal line of the retardation layer, and R[−40°] of the retardation layer, which is retardation measured for incident light having a wavelength of 550 nm coming in a second direction tilted by 40 degrees oppositely toward the tilt direction of the retardation layer relative to the normal line of the layer, meet following relation (III):

$$1 < R[+40°]/R[-40°] \tag{III}$$

provided that the first and second directions are directions in a same plane (incident plane) that includes the normal line and the tilt direction of the retardation layer, and R[+40°]>R[−40°].

2. The liquid crystal display device according to claim 1, wherein the in-plane slow axis of the retardation layer is orthogonal to the absorption axis of the polarizing layer disposed at a closer position to the retardation layer.

3. The liquid crystal display device according to claim 1, wherein the retardation layer is disposed between one of the pair of the polarizing layers and the liquid crystal cell, and the Re(550) of the retardation layer is from 25 to 230 nm.

4. The liquid crystal display device according to claim 1, wherein the retardation layer is disposed between the both of the pair of the polarizing layers and the liquid crystal cell, and the Re(550) of the retardation layer is from 25 to 230 nm.

5. The liquid crystal display device according to claim 1, wherein the retardation layer has a principal axis tilted by from 9 to 47 degrees in the thickness direction.

6. The liquid crystal display device according to claim 1, wherein the retardation layer is a film comprising at least one selected from the group consisting of cyclic olefin copolymers, cellulose acylates, polyesters and polycarbonates.

7. The liquid crystal display device according to claim 6, wherein the retardation layer is a film formed of a composition comprising less than two materials selected from the group consisting of cyclic olefin copolymers, cellulose acylates, polyesters and polycarbonates.

8. The liquid crystal display device according to claim 1, wherein the retardation layer is a film prepared by allowing a melt in a film form of a composition comprising a thermoplastic polymer to pass through two rolls having a different circumferential speed from each other.

9. The liquid crystal display device according to claim 1, wherein the retardation layer is a stretched film.

10. The liquid crystal display device according to claim 1, wherein the retardation layer comprises a plurality of layers.

11. The liquid crystal display device according to claim 1, wherein $\Delta n \cdot d$ which is the product of a thickness d and a birefringence $\Delta n$ of the liquid crystal layer meets following relation:

$$200 \text{ nm} \leq \Delta n \cdot d \leq 600 \text{ nm}.$$

12. The liquid crystal display device according to claim 1, wherein in a state where a drive voltage is not applied, liquid crystal molecules in the liquid crystal layer are aligned parallel to the substrate plane, and the liquid crystal layer has a twist angle between the first substrate and the second substrate is from 0° to 134°.

* * * * *